(12) United States Patent
Randall et al.

(10) Patent No.: US 11,136,110 B2
(45) Date of Patent: Oct. 5, 2021

(54) PITCH CONTROL SYSTEM

(71) Applicant: Qingdao Randall Aerodynamic Engineering, LLC, Jiaozhou (CN)

(72) Inventors: Ryan M. Randall, Tucson, AZ (US); Chunmei Chen, Jiaozhou (CN)

(*) Notice: Subject to any disclaimer, the term of this patent is extended or adjusted under 35 U.S.C. 154(b) by 97 days.

(21) Appl. No.: 16/119,272

(22) Filed: Aug. 31, 2018

(65) Prior Publication Data
US 2020/0055587 A1 Feb. 20, 2020

Related U.S. Application Data

(63) Continuation of application No. PCT/CN2018/100621, filed on Aug. 15, 2018.

(51) Int. Cl.
| | |
|---|---|
| *F03D 80/70* | (2016.01) |
| *B64C 11/34* | (2006.01) |
| *B64C 11/00* | (2006.01) |
| *F03D 7/02* | (2006.01) |
| *F03D 7/04* | (2006.01) |
| *B64C 39/02* | (2006.01) |

(52) U.S. Cl.
CPC .......... *B64C 11/343* (2013.01); *B64C 11/008* (2013.01); *F03D 7/0224* (2013.01); *F03D 7/041* (2013.01); *F03D 80/70* (2016.05); *B64C 39/024* (2013.01); *B64C 2201/165* (2013.01); *F05B 2240/221* (2013.01); *F05B 2260/74* (2013.01); *F05B 2260/75* (2013.01); *F05B 2260/77* (2013.01); *F05B 2260/79* (2013.01); *F05B 2260/966* (2013.01)

(58) Field of Classification Search
CPC ... B64C 11/343; B64C 11/008; F03D 7/0224; F03D 7/041; F05B 2260/74; F05B 2260/75; F05B 2260/77; F05B 2260/79; F05B 2260/966
See application file for complete search history.

(56) References Cited

U.S. PATENT DOCUMENTS

| | | | | |
|---|---|---|---|---|
| 1,986,752 A | * | 1/1935 | Rorvik | F03D 7/0224 416/89 |
| 4,952,119 A | * | 8/1990 | Widseth | F03D 7/0252 416/3 |

(Continued)

*Primary Examiner* — Justin D Seabe
*Assistant Examiner* — Theodore C Ribadeneyra

(57) ABSTRACT

A pitch control system characterized by a hub with at least two blade housings on the hub that are disposed around the hub axis. The blade housings have corresponding blades that engage with them. The blades spiral along housing longitudinal axes toward and away from the hub axis about a segment of helical path to effect a change in the pitch of each blade. One or more elastic members draw the blades toward the hub axis, either directly or indirectly. There are pitch mechanisms effective to facilitate blades to spiral around housing-longitudinal axes. A blade will spiral away from the hub axis when the centrifugal force exerted on the blade exceeds the opposing elastic force in the housing-longitudinal direction (neglecting other forces). Conversely, blades spiral toward the hub axis when said centrifugal force is less than said elastic force. There is an imaginary plane orthogonal to the hub axis. Housing-longitudinal axes have angles with respect to the imaginary plane of not more than 30 degrees.

12 Claims, 14 Drawing Sheets

(56) References Cited

U.S. PATENT DOCUMENTS

| | | | | |
|---|---|---|---|---|
| 5,286,166 A | * | 2/1994 | Steward | B63H 3/008 |
| | | | | 416/136 |
| 6,761,533 B2 | * | 7/2004 | Favaro | F03D 7/0224 |
| | | | | 416/51 |
| 7,789,624 B2 | * | 9/2010 | Appa | F03D 7/0224 |
| | | | | 416/41 |
| 2004/0022628 A1 | * | 2/2004 | Favaro | F03D 7/0224 |
| | | | | 416/51 |
| 2007/0207033 A1 | * | 9/2007 | Appa | F03D 7/0224 |
| | | | | 416/104 |
| 2014/0360830 A1 | * | 12/2014 | Heverly | B64C 11/008 |
| | | | | 188/378 |
| 2017/0297685 A1 | * | 10/2017 | Heverly | B64C 27/001 |

* cited by examiner

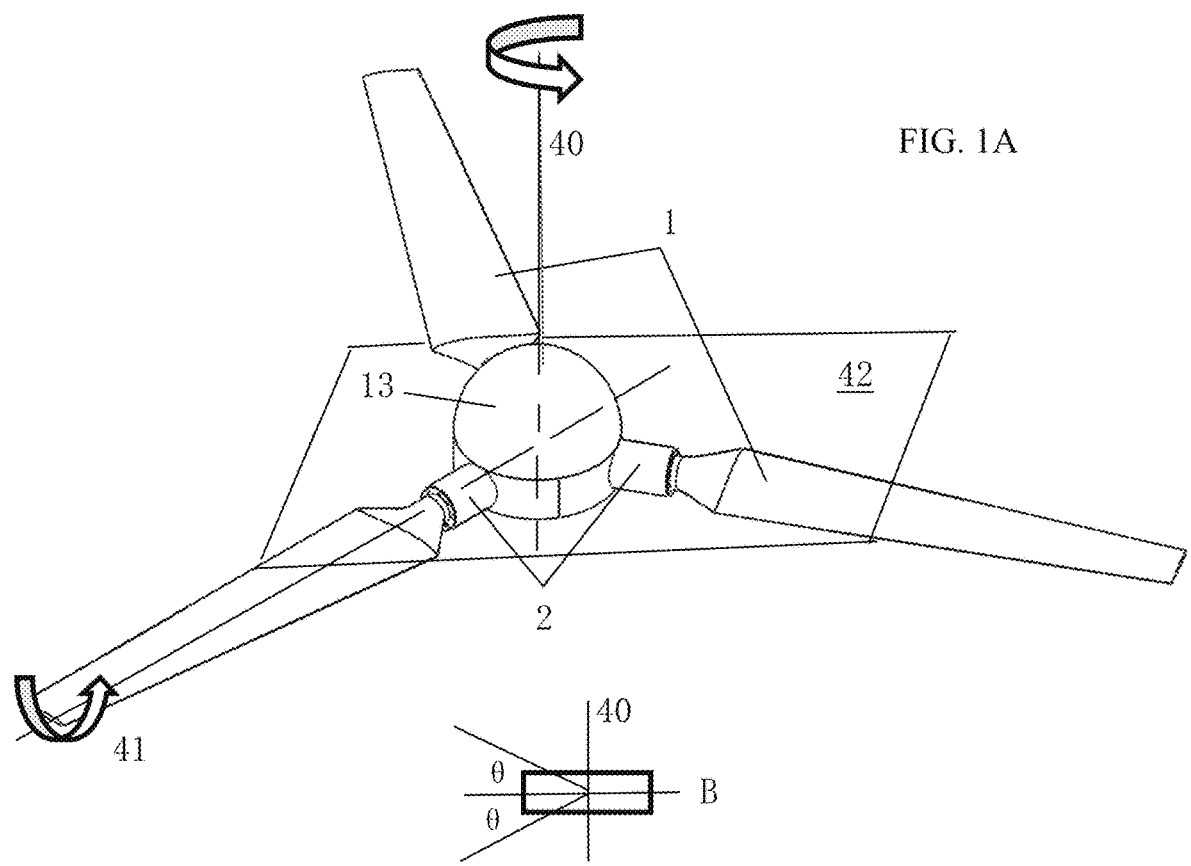
FIG. 1A
FIG. 1B
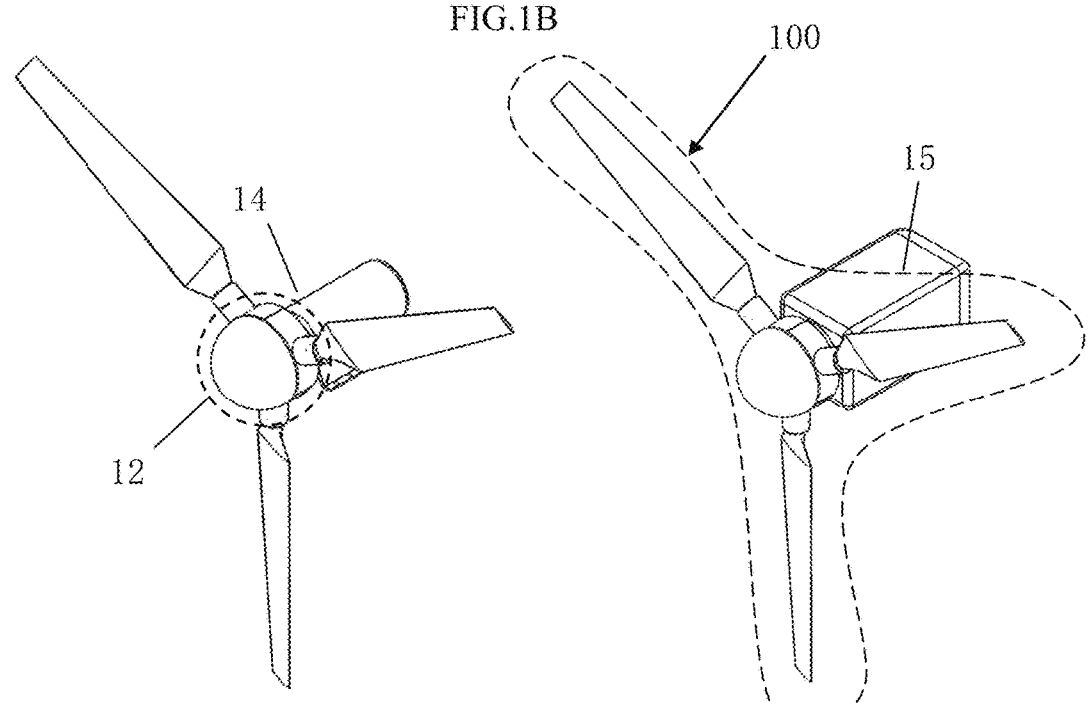
FIG. 2
FIG. 3

PITCH CONTROL SYSTEM

FIELD OF INVENTION

The present invention relates to the field of pitch control systems for rotating blades.

DESCRIPTION OF RELATED ART

Turbomachines generally include one or more circular arrays of rotating blades. Such arrays include: axial fans, centrifugal fans, mixed fans, propellers, rotors, and wind turbine blades. All such blades can be fixed-pitch or variable pitch. Fixed-pitch systems typically vary rotation rate to obtain desired parameter values (e.g. flow rate) whereas some variable-pitch systems hold rotation-rate approximately constant (e.g. helicopter rotors).

For high-performance or energy-intensive turbomachinery it often makes sense to control both pitch and rotation-rate to maximize aerodynamic efficiency, thrust, or another parameter of interest. In addition to optimizing performance, pitch control systems can address issues like over-spinning.

Many existing pitch control systems are somewhat crude. Pitch may be manually controlled by a person moving a lever, which results in sub-optimal combinations of pitch and rotation rate. In the case of variable-pitch propellers a pilot may actively set the pitch of the propeller once before takeoff and again during cruise. In this case pitch has only been varied twice over the course of hours. If pitch were varied with rotation-rate automatically and continuously throughout the flight benefits would include reduced fuel consumption, extended range, and enhanced endurance.

Existing pitch control systems can automatically and continuously vary blade pitch. For example, helicopters use complex linkages, a swashplate, and other mechanisms to cause a repeating blade-pitching cycle. The blade-pitching cycle is used to control the roll and pitch of the helicopter. These pitch control systems are only appropriate within a narrow range of applications.

Existing advanced pitch control systems can continuously and automatically adjust blade pitch even during variable rotation-rate operation, but are not broadly-used due to their complexity and expense. Many turbomachines could benefit from a simpler, less expensive system that is appropriate for small blades, including RC aircraft propellers.

At present, advanced pitch control systems are almost exclusively applied to large and costly turbomachines, including large wind turbines. For large wind turbines these systems typically include a separate motor for each blade. Each motor has a pinion that mates with teeth cut into a blade, or cut into a part that is attached to a blade. The motor receives electrical commands from an onboard computer based on internal programming and data acquired from: anemometers, thermometers, tachometers, and other sensors. While functional, such systems are also complicated and pricey. Error in, or failure of, any sensor may: reduce the system's performance, result in severe damage, and/or completely stop wind turbine operation. Such systems are also subject to lightning strikes, power-outages, and other electrical-system failures, as well as user-errors that can occur when a person sends commands, changes settings, or updates software. Down-time can be expensive, as can performing maintenance up on high towers in remote locations. The prior art, even for large turbomachines, could be improved using a simpler and a more reliable pitch control system.

BRIEF SUMMARY OF THE INVENTION

The present invention is a blade pitch control system for turbomachinery that solves the aforementioned problems of the prior art. The pitch control system (100) includes a hub (12) with at least two blade housings (2). The blade housings (2) are disposed in a circular array around the hub axis (40). A blade (1) engages with each blade housing (2) such that the blade (1) can spiral toward and away from the hub axis (40) about a segment of a helical path (43) to effect a change in the pitch of the blade (1). The direction of spiral is along a housing-longitudinal axis (41). Consider an imaginary plane (42) that is orthogonal to the hub axis (40). The housing-longitudinal axis (41) is at an angle, $\theta$, with respect to the imaginary plane (42). The magnitude of $\theta$ is less than or equal to 30 degrees.

One or more elastic members (3) directly or indirectly draw the blade (2) toward the hub axis (40). A pitch mechanism (4) facilitates the blade (1) to spiral along the housing-longitudinal axis (41). The blade (1) is subjected to the elastic force and a centrifugal force. The elastic force comes from one or more elastic members. The centrifugal force arises as a result of hub (12) rotation, which causes blades (1) to rotate about the hub axis (40). Each force has an opposing component in the housing-longitudinal direction (41). The blade (1) is drawn away from the hub axis (40) when the component of centrifugal force is greater than the component of elastic force (neglecting other forces, including aerodynamic, gravitational, and frictional). When the component of centrifugal force is less than the component of elastic force the blade (1) is drawn toward the hub axis (40).

The pitch mechanism (4) includes a guide (5) that stretches along a segment of helical path (43) and a guide-mating part (6), wherein the guide (5) and guide-mating part (6) have a constrained-motion relationship that involves sliding or rolling along one-another to help facilitate a blade (1) to spiral along a housing-longitudinal axis (41).

Blade housings (2) may have two lateral surfaces each, an interior lateral surface (44) and an exterior lateral surface (45). Blade roots (16) may also have two lateral surfaces: an interior (46) and an exterior (47). There are two ways to configure the guide (5) and guide-mating parts (6). First the guides (5) may be placed on a lateral surface of the blade housing (44, 45) with the guide-mating part disposed on a lateral surface of the blade root (46, 47). Alternatively, each guide may be placed a lateral surface of the blade root (46, 47) and guide-mating parts may be placed on a lateral surface of the blade housing (44, 45). A set of bearings may be disposed on the blade root (16) and/or the blade housings (2) to reduce friction between the blade root (16) and blade housing (2) or between the guides (5) and guide-mating parts (6). A rotating cover (13) is disposed on the hub (12) and rotates about the hub axis (40). It is substantially dome or cone-shaped.

Elastic members (3) are disposed within the hub (12) and/or blade housings (2). The elastic members (3) may be attached directly or indirectly to blade roots (16) on one end and to blade housings (2), the hub (12), a shaft (10), a rotating cover (13), or a blade weight assembly (7) on the other end.

The outer diameter of blade roots (16) may be smaller than the inner diameter of blade housings (2) such that blade roots (16) slide into their corresponding blade housings (2). Alternatively, the blade roots (16) may have inner diameters that are larger than the outer diameters of their corresponding housings (2) such that the blade roots (16) slide over their corresponding blade housings (2). The blade housings (2) can be wholly or partially contained within the hub (12) or lie completely outside of the hub (12).

The pitch control system can further comprise a blade weight assembly (7) which wholly or partially counteracts the unbalancing effect of blade weight on a blade's housing-longitudinal position with respect to other blades. The blade weight assembly (7) comprises a track (8) and a track-mating part (9). The track (8) is disposed around the hub axis (40) to form a closed-loop. The track-mating part (9) is constrained to move around the track (8). The track (8) can have a non-circular cross-section and/or be vertically-offset from the hub axis (40).

Some embodiments of the pitch control system may utilize elastic members (3) that are helical springs aligned with the housing longitudinal axis (41). The elastic members (3) pass through the hub (12), sidewall (27), and blade housing (2) and connect to the blade root (16) on one end and to the blade weight assembly (7) on their other end.

A preferred embodiment of the pitch control system utilizes a cylindrically-shaped track (8) whose track-mating part (9) is also cylindrically-shaped and is concentric with the track (8) and hub axis (40). The track-mating part (9) rotates around the track (8). The preferred embodiment utilizes an elastic member (3) that is a torsion spring (48) that encircles the interior or exterior of the track (8) and connects to the track-mating part (9).

The preferred embodiment also utilizes rods (19) in a circular array about the hub axis (40). The rods each have two ends. One end lies within a blade root (16) or blade housing (2) and connects directly or indirectly to blade roots (16). The other end passes through the hub sidewall (27) into the hub (12) where it pivotally connects with one end of an arm (24). The other end of the arm (24) pivotally connects with the track-mating part (9). A bushing (22) is used to reduce friction between the rod (19) and the hub's sidewall (27) when the rod (19) slides in-and-out. A bearing (20) is used to reduce friction as the blade (1) rotates with respect to the rod (19).

Compared to the prior art, the advantages of the present invention are:
1) Broad applicability
2) Simplicity
3) Low cost
4) Low maintenance
5) Durability
6) Reliability, which is not subject to:
   a. power-loss
   b. electronics failure
   c. sensor inaccuracy, or
   d. user-error

BRIEF DESCRIPTION OF THE SEVERAL VIEWS OF THE DRAWING

FIG. 1A depicts the pitch control system with a three-bladed propeller or turbine alongside an important plane and axes;
FIG. 1B defines an intended out-of-plane range restriction for blade housings;
FIG. 2 is a depiction of the pitch control system attached to a motor;
FIG. 3 shows the pitch control system with a housing surrounding the motor or generator;
FIG. 25 shows the important forces and moments that a blade is subjected to.

DETAILED DESCRIPTION OF THE INVENTION

Dynamics

Blades are mounted in blade housings that are disposed in a circular array around the hub. There is a centrifugal force exerted on all rotating blades which is proportional to the square of the hub rotation-rate. The faster the rotation-rate the higher the centrifugal force pulling a blade away from its hub. The centrifugal force is resisted by an elastic member. For discussion we temporarily assume that the elastic member is a linear spring, which stretches as rotation-rate increases. As the spring stretches the blade is forced to rotate about its longitudinal axis due to its guides and guide-mating parts. Guide-mating parts can be designed to strictly increase the pitch as rotation-rate increases (as for a propeller), or to increase the pitch over a safe range (as with a turbine) and then to reduce and/or zero-out the pitch if the rotation-rate becomes too high.

The pitch control system has a nontrivial design process, which one of ordinary skill in the art may not independently conceive. A dynamic model of the system must be created to analyze dynamics and behavior to help produce an appropriate design for a given application. To illustrate this process an example dynamic model is derived for constant-velocity hub rotation in the vertical plane with the blade weight assembly of Embodiment B. It may be easily modified to correspond to operation without a blade weight assembly (Embodiment A), and will give insight into modeling for various other embodiments of the pitch control system, including Embodiment C.

Figure 24:
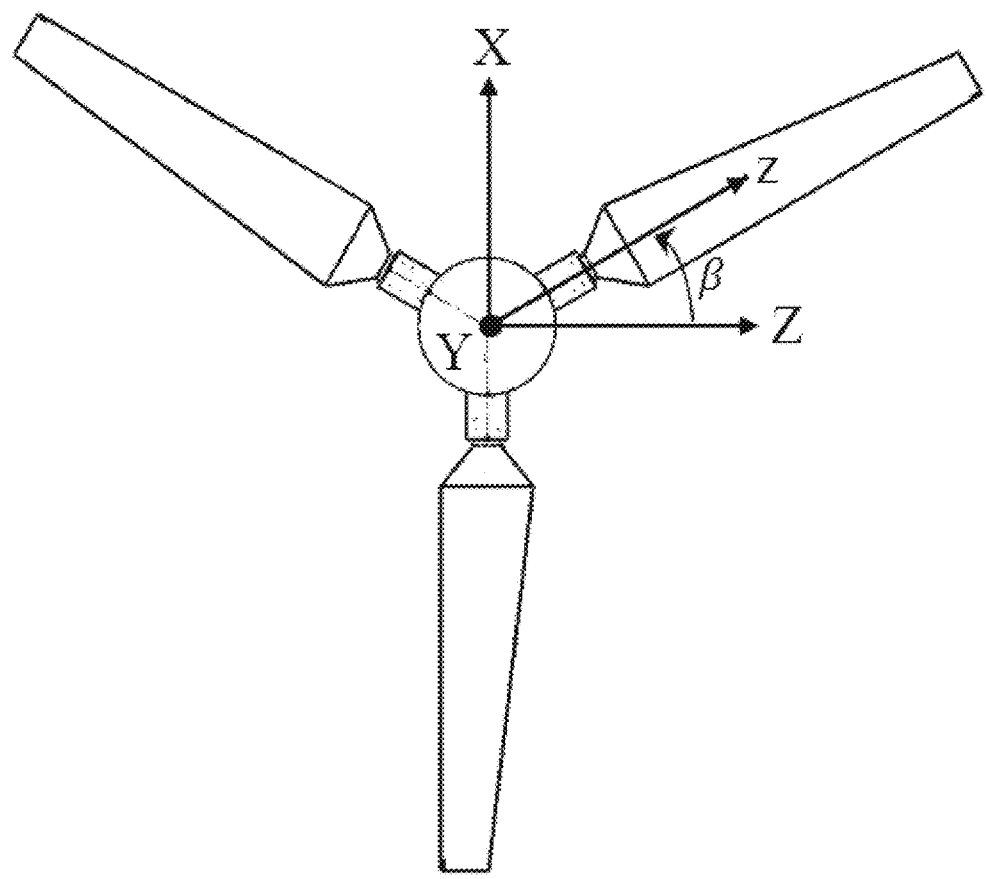
FIG. 24 illustrates earth-fixed and body-fixed coordinate systems.

It is useful to define an Earth-fixed and a hub-fixed coordinate system having the same origin. XYZ is the earth-fixed system, and xyz is the hub fixed system, as seen in FIG. 24. The center of both systems is located where the centerlines of the blade housings intersect. The X axis is vertical, the Y axis comes out of the page, and the Z axis is horizontal. The y and Y axes are always co-linear, but the x and z axes change their orientation as the hub rotates through some angle, $\beta$, such that the z-axis always points along the centerline of one blade-housing.

Figure 25:
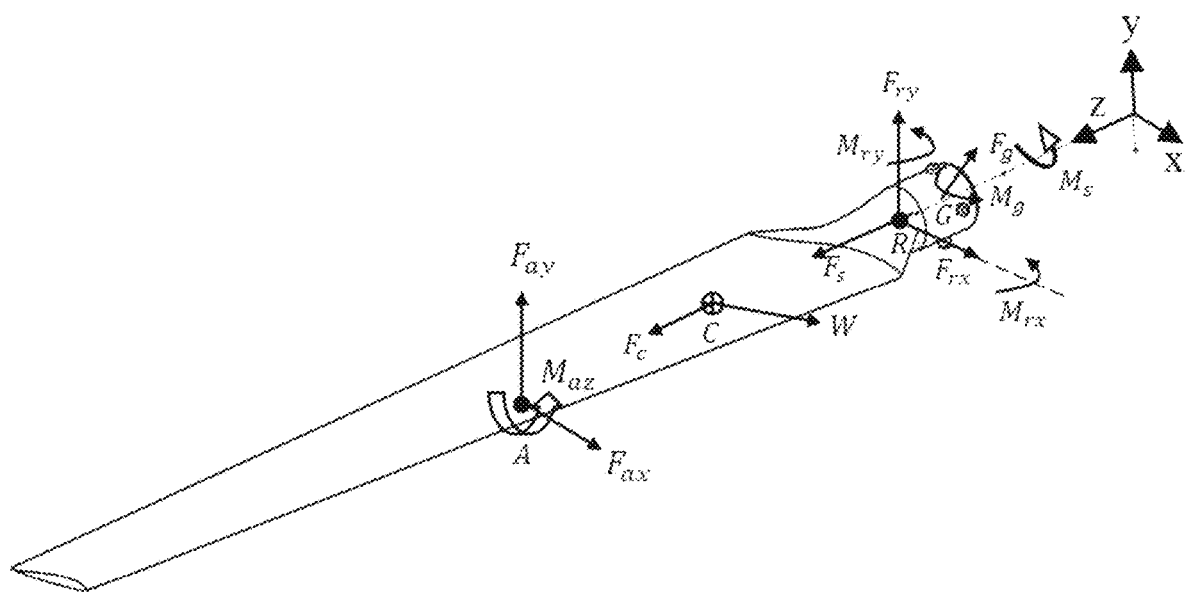

It is necessary to consider the forces and moments being exerted on a blade to model and understand its motion, including responses to disturbances. Such forces come from aerodynamics, gravity, interactions between guides and guide-mating parts, centrifugal force, elastic forces, and interactions between the blade and its blade housing. A free-body diagram is helpful in understanding the forces and moments, as provided in FIG. 25.

There are four key points, A, C, R, and G. A is the aerodynamic center of the blade and it is the point at which aerodynamic force ($\vec{F}_a$) and moment ($\vec{M}_a$) are applied. It is assumed that aerodynamic force in the z-direction is negligible, as are aerodynamic moments about the x and y axes.

C is the center of mass of the blade and it is the point at which the centrifugal force ($\vec{F}_c$) and weight ($\vec{W}$) are applied. The weight of the blade may act in different hub-fixed coordinate directions as the blade rotates. Unfortunately, the weight will generally act in the xz plane and contribute to force in the z-direction resulting in a cyclical change of the blade-pulling force that ultimately sets the pitch angle of each blade. As the pitch angle of each blade varies cyclically a cyclical variation in all applied forces and moments will occur at the frequency of blade rotation. The blade gravity assembly is designed to correct for this effect by pushing up on the blade when it is at the top of its cycle and by pulling-up on the blade when it is at the bottom of its cycle. As a result, the z-position of the blade will not depend on its angular position, $\beta$, only on the rotation rate of the hub. Mathematically, we can model the effect of the blade weight assembly by changing the free-length of the spring, $z_{s0}$, as a function of angular position, $\beta$.

An important consideration is whether the added cost and complication associated with the blade weight assembly can be avoided. The weight of a blade is constant and the centrifugal force is proportional to the square of the hub rotation rate, so for large rotation rates the centrifugal force will dominate the weight. Also, the effect of the blade weight can be diminished by designing blades with higher mass densities toward their tips, which will further increase the centrifugal force relative to the weight. To avoid resonance, the system can be designed such that its natural frequencies are outside of the rotation-rate domain. Damping of the system may also be applied and adjusted. Consider a simple point mass rotating in a vertical plane, connected to its center of rotation by a string. When the point mass is at its lowest position the centrifugal force and weight act in the same direction, in which case the tension in the string is: $F_T = m \cdot (\dot{\beta}^2 l + g)$; where l is the length of the string and g is the acceleration of gravity. For a small UAV the propeller radius may be 0.1 m, corresponding to a "string length" of perhaps 0.035 m. A small UAV's propeller rotation rate may be 78.5-130.9 rad/s during flight, so these frequencies should be avoided as system natural frequencies. For the small UAV case modeled as a mass and string, gravitational force is 1.6% to 4.5% of the centrifugal force over the entire range of hub rotation rates. For this case pitch oscillation will be slight, so it may be practical to omit the blade weight assembly altogether. All systems whose rotation is in a horizontal plane, or which operate absent gravity, will work perfectly-well without a blade weight assembly. As another example, consider a typical large wind turbine rotating in a vertical plane at 1.05 rad/s with a blade length and mass of 40 m and 5500 kg, respectively. For this case the gravitational force is 67% of the centrifugal force, so a blade weight assembly is required.

Point R is the point at which reaction force ($\vec{F}_r$) and moment ($\vec{M}_r$) are assumed to be applied. In reality, the distribution of reaction forces over blade roots will depend upon the details of root-housing interaction, presumably through one or more bearings that facilitate smooth translation of blade roots relative to blade housings. For this example point R is drawn at the outboard edge of the blade housing at the center of its circular cross-section. If we are not interested in the details, then the location of R becomes somewhat arbitrary as an accurate reaction force-moment system can be determined for any assumed point of application. Reaction force and moment in the z-direction are assumed negligibly small (well-lubricated, no friction). The elastic force ($\vec{F}_s$) also passes through point R—a geometric result.

Figure 26:
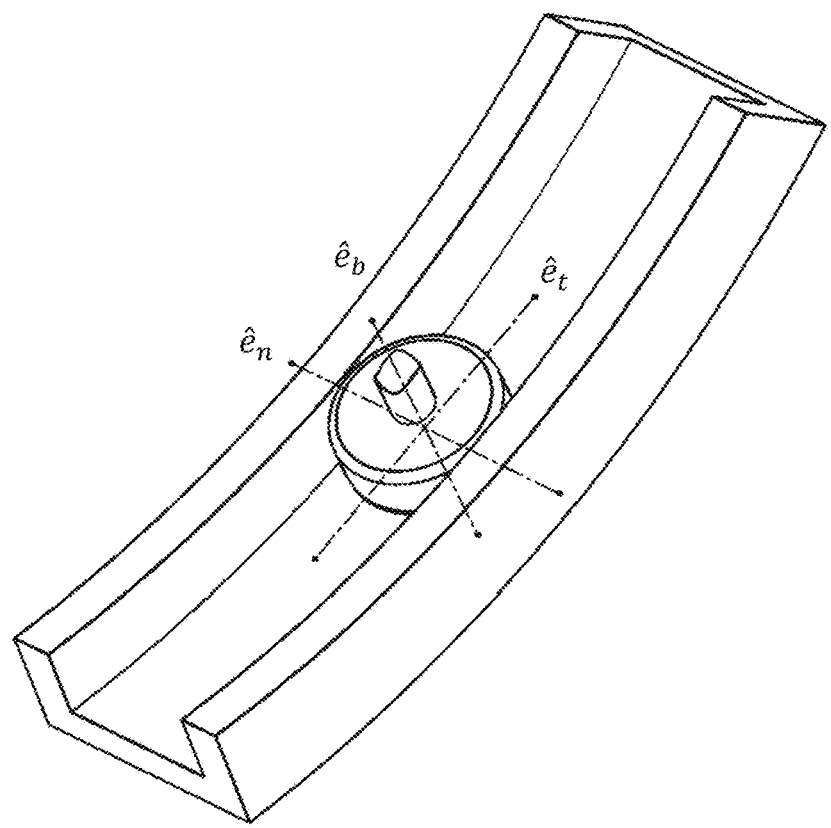
FIG. 26 illustrates an orthogonal coordinate system used to illustrate "normal" and "binormal"

The last key point is G. It is at the center of the circular cross section in the plane of the guide-mating parts. By separating reaction and guide-mating part forces guide-mating parts can be properly designed to withstand applied loads. For this example forces exerted on the guide-mating parts are modeled as one force ($\vec{F}_g$) applied at point G, with a corresponding moment ($\vec{M}_g$). The guides and guide-mating parts may be designed many different ways. FIG. 26 provides an example, for which it is assumed that guide depth is adequate to prevent the tips of guide-mating parts from touching the bottom of guides. As a result, there is no force exerted on guide-mating parts in the guide binormal direction, $\hat{e}_b$. Furthermore, friction is neglected such that there is no force exerted on the guide-mating part in the guide-tangent direction, $\hat{e}_t$. Therefore, guides are modeled as exerting forces on guide-mating parts in only the guide-normal direction $\vec{F}_g = F_g \hat{e}_n$, as seen in FIG. 26. A perfectly rigid blade is assumed and equations of motion are derived:

$$F_{ax} + F_{rx} + F_{gx} + W_x = 0 \quad \text{a.}$$

$$F_{ay} + F_{ry} + F_{gy} = 0 \quad \text{b.}$$

$$F_c + F_s + F_{gz} + W_z = m\ddot{z} \quad \text{c.}$$

$$-F_{ay} \cdot (z_A - z_R) + F_{gy} \cdot (z_R - z_G) + M_{rx} = 0 \quad \text{d.}$$

$$F_{ax}\cdot(z_A-z_R)-F_{gx}\cdot(z_R-z_G)+W_x\cdot(z_C-z_R)+M_{ry}=0 \quad \text{e.}$$

$$M_{az}+M_s+M_{gz}=I\ddot{\theta}_z \quad \text{f.}$$

The six equations of motion have eight unknowns: $F_{gx}$, $F_{gy}$, $F_{gz}$, $M_{gz}$, $F_{rx}$, $F_{ry}$, $M_{rx}$, $M_{ry}$; but more equations can be written concerning track-roller interactions.

$$F_{gx}=F_g\cdot(\hat{e}_n\cdot\hat{i}) \quad \text{g.}$$

$$F_{gy}=F_g\cdot(\hat{e}_n\cdot\hat{j}) \quad \text{h.}$$

$$F_{gz}=F_g\cdot(\hat{e}_n\cdot\hat{k}) \quad \text{i.}$$

Three new equations have been written, with four new unknowns introduced: $F_g$, $(\hat{e}_n\cdot\hat{i})$, $(\hat{e}_n\cdot\hat{j})$, $(\hat{e}_n\cdot\hat{k})$, but $\hat{e}_n$ will be determined during the guide design process. Afterward $F_{gx}$, $F_{gy}$, and $F_{gz}$ will become functions one unknown, $F_g$, and we will have nine equations with nine unknowns, which is a solvable system with a unique solution.

Figure 27:
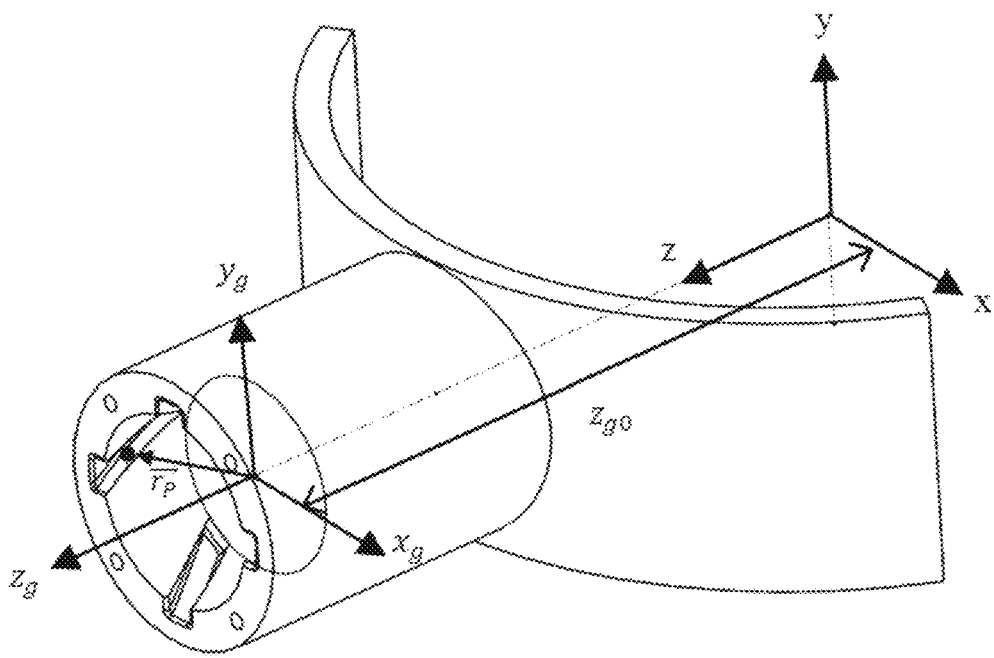
FIG. 27 shows a guide-based coordinate system relative to the hub-fixed system.

Guide design is novel to this particular invention. It is convenient to define a g-subscripted coordinate system that starts at the inboard edge of the guide such that $z=z_g+z_{g0}$, as shown in FIG. 27. For this example, each guide features a constant radial distance from the centerline of the blade housing, making cylindrical coordinates natural.

$$\vec{r}_p=r_g\hat{e}_r+r_g\cdot\theta_g\hat{e}_\theta+z_g\hat{k} \quad r_g=\text{constant} \quad \text{j.}$$

$\vec{r}_p$ can be expressed as a function of one variable, $z_g$, where the function $\theta_g(z_g)$ determines the pitch angle of the blade when it has been pulled to a particular $z_g$ position. Several optimum rotation-rate/pitch combinations can be computed for a particular blade design operating within a particular domain. Curve-fitting can be applied to the optimum rotation-rate/pitch points within the domain to obtain $\theta_g(z_g)$. Converting back to the primary hub-fixed Cartesian coordinate system yields a useful description of the track:

$$\vec{r}_p(z)=x(z)\hat{i}+y(z)\hat{j}+z\hat{k} \quad \text{k.}$$

Next the curve length "s" of the guide is determined as a function of Z.

l.

$$s(z)=\int_{z_{g0}}^{z}\left[\left(\frac{dx}{dz}\right)^2+\left(\frac{dy}{dz}\right)^2+1\right]^{1/2}d\tilde{z}$$

Introducing $$\frac{dx}{dz}=x', \frac{ds}{dz}=s',$$

etc. we determine the unit normal vector as:

m.

$$\hat{e}_n=\frac{\vec{r}''s'-\vec{r}'s''}{\sqrt{(\vec{r}''\cdot\vec{r}'')s'^2-(\vec{r}'\cdot\vec{r}'')^2}}$$

The centrifugal force is modeled as:

$$\vec{F}_c=\dot{\beta}^2\cdot m\cdot z_c\hat{k} \quad \text{n.}$$

where m is the mass of the blade, $\dot{\beta}$ is the hub rotation rate, and $z_c$ is the position of the center of mass of the blade, which is a function of $\dot{\beta}$.

If the hub rotates is in a vertical plane then blade weight will not have a y-component. In this case, the force due to weight in the hub-fixed coordinate system will depend upon the angle of rotation of a blade as follows:

$$W_x=-W\cdot\sin(\beta) \quad \text{o.}$$

$$W_z=-W\cdot\cos(\beta) \quad \text{p.}$$

If the elastic element is assumed to be a spring that is linear over its operating range than the force it exerts on the blade is modeled as:

$$\vec{F}_s=-k_s\cdot(z-z_{s0})\hat{k} \quad \text{q.}$$

where $k_s$ is the linear spring constant and $z_{s0}$ is the z-position of the blade rollers corresponding to zero spring compression or elongation. $z_{s0}$ is designed to cancel-out the weight of the blade in the z-direction, $W_z$; it becomes a known function of the hub rotation angle $\beta$. Pitching of the blade will cause the spring to twist as well as elongate. If (1) the spring moment is significant, (2) coupling is neglected, and (3) the moment due to twisting is assumed linear, then:

$$\vec{M}_s=-\tau_s\cdot(\theta-\theta_{s0})\hat{k} \quad \text{r.}$$

where $\tau_s$ is a torsional spring constant and $\theta_{s0}$ is the pitch angle corresponding to zero spring twist. Given the above, the net reaction force and moment exerted on the blade can be determined using the previously-derived equations of motion.

As a reminder the translation of blades along housings will cause changes in blade disc diameter and consequently the velocity due to rotation at a particular blade section. If translation is significant then these aerodynamic effects may not be negligible in the presented models. In that case special attention must be paid to the aerodynamic forces and moments exerted on a blade, and changes in blade disc area must also be accounted for.

Structure

Three sample embodiments are provided to describe different structural manifestations of the pitch control system. All sample embodiments of the pitch control system include: blades (1), blade housings (2), elastic members (3), pitch mechanisms (4) with guides (5) and guide-mating parts (6), a shaft (10), hub (12), rotating cover (13), and motor (14). Two sample embodiments include a blade weight assembly (7) with tracks (8) and track-mating parts (9).

The hub, blade housings, and blades all rotate with the shaft. Blades require a centripetal force to maintain their circular motion, which is provided by an elastic element that is directly or indirectly connected to each blade. The faster the shaft spins the greater the stretching of elastic members and the greater the outward translation of the blades.

Pitching mechanisms convert blade translation into blade pitching by guiding the blades to pitch about their longitudinal axes whenever they translate in their longitudinal directions. To achieve this guides are placed on blade housings, or on blade roots. Corresponding guide-mating parts are placed on blade roots, or on blade housings. Guides force the guide-mating parts to move along them such that a desired pitch is achieved at each rotation rate. Depending on the application, pitching mechanisms can be designed to maximize aerodynamic efficiency by maintaining an optimum combination of pitch and rotation rate. Alternatively, they can be designed to allow a motor to have a narrower range of rotation rates while producing a wider range of flow speeds. For turbines, pitching mechanisms can provide over-speed protection by reducing pitch as rotation rate becomes excessive. Pitch mechanisms will typically be designed to increase blade pitch with blade rotation-rate. For these cases, as each blade moves outward its pitch angle gradually increases. Conversely, when each blade moves inward its pitch angle gradually decreases.

Figure 33:
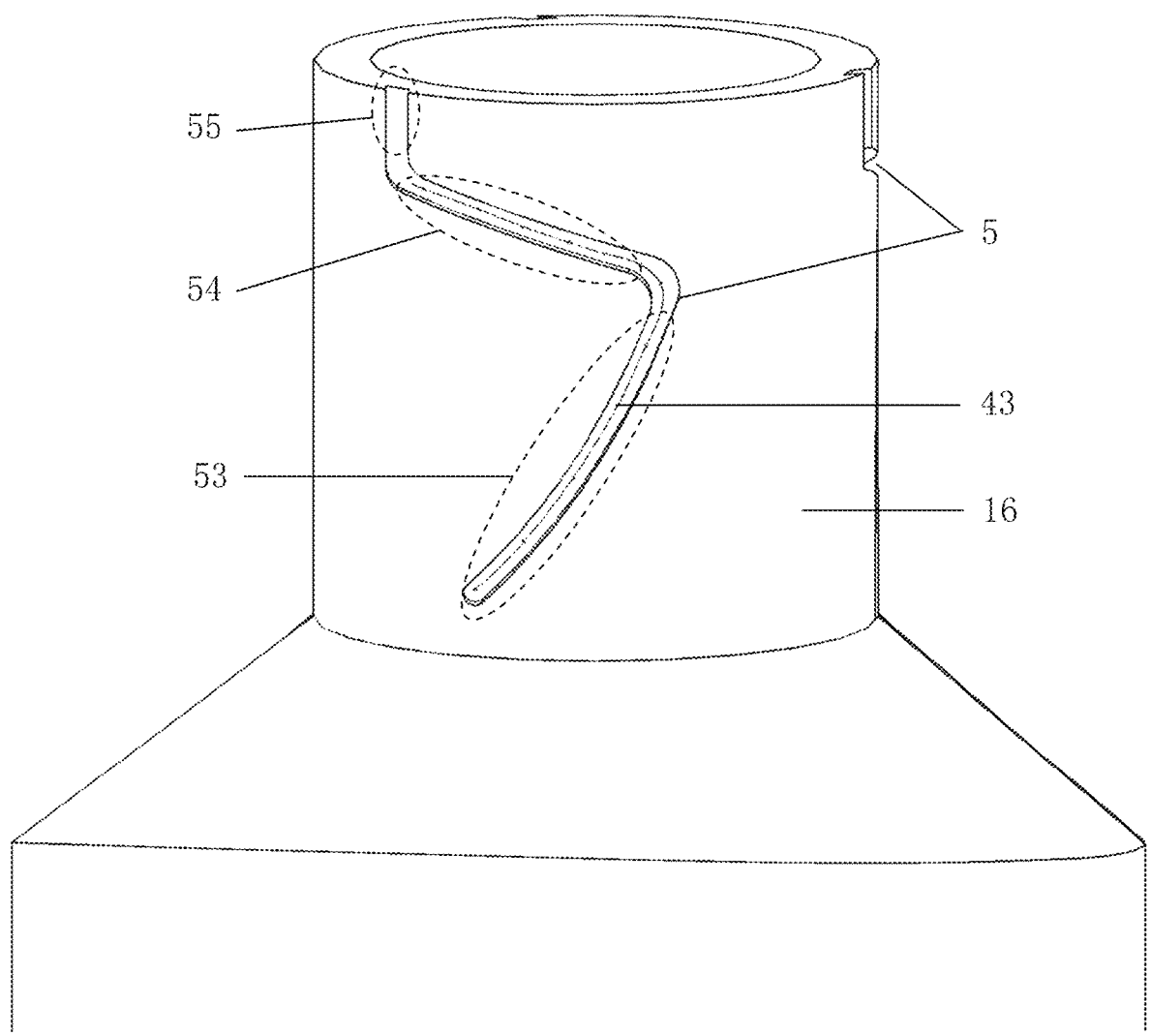
FIG. 33 shows a segment of a helical path on the exterior lateral surface of a blade root with a guide cut along the path.

FIG. 33 provides an example of three guides (5) placed on the exterior lateral surface of a blade root (47) that follow a segment of a helical path (43). The example guides have an installation section (55) which allows them to slide over guide-mating parts (6) disposed about the inner lateral surface of a corresponding blade housing (2). The example guides have an increasing pitch section (53) that causes pitch to increase as rotation-rate increases. As rotation-rate approaches its safety threshold the blades will continue to move outward, but their pitch will decrease via the decreasing pitch section (54).

When the shaft rotates at constant speed the net force and moment on each blade becomes balanced and a state of uniform circular motion about the shaft is realized by each blade. When properly designed and constructed each blade translates an approximately equivalent longitudinal amount, and pitches an approximately equivalent amount. Inertial and aerodynamic forces are reasonably well-balanced over the blade-disc, and there is little tendency to induce vibration. A blade weight assembly is not required for systems whose blade disc axis (hub axis) is vertically-oriented (parallel to gravity) or for high rotation-rate systems. Examples of such systems include any size multi-rotors (vertically-oriented blade disc axes) and smaller RC airplane propellers (high rotation-rate).

Embodiment A

A plurality of blade housings (2) is disposed in a circular array around the hub (12), as seen in FIG. 1. A rotating cover (13) attaches to the hub. The hub (12) is attached to a motor (14), FIG. 2. There may be a gearbox between the motor and hub. The motor-hub attachment technique could include a collet, screw-mounting plate, or other mechanism. Motors will typically utilize motor covers (15), as seen in FIG. 3.

Figure 4:
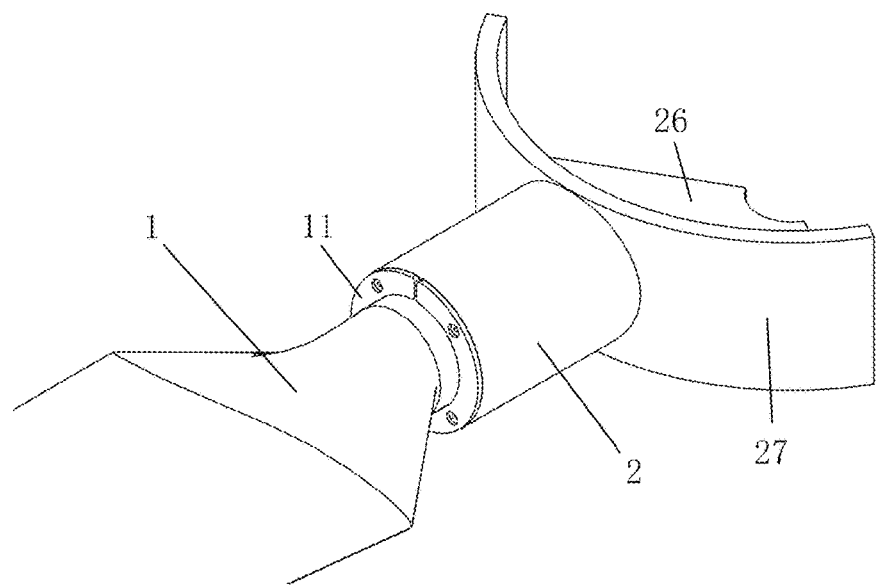
FIG. 4 is a close-up view of a single blade and blade housing for Embodiment A.

Blade housings (2) allow blades (1) to be mounted around the hub. The blade housings (2) of the presented embodiments have mounting holes (28) for blades (1). Blade housings and blade roots (16) may be shaped like cylindrical tubes. Blade housings do not restrict their respective blades from translating in their substantially blade-longitudinal direction. Blade translation relative to blade housings is reminiscent of classical telescopes being extended or collapsed. A radial linear bearing, lubrication, or other friction-reducing system can be used to facilitate smooth translation of blades with respect to blade housings. If the outer diameter of blade roots is made smaller than the inner diameter of blade housings then blade roots may slide into blade housings, as shown in FIG. 4.

Figure 5:
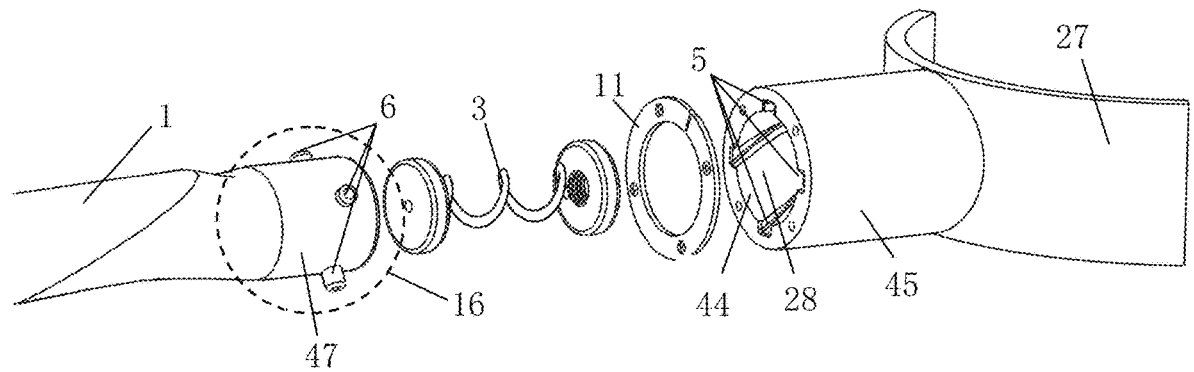
FIG. 5 is an exploded view of Embodiment A.
Figure 6:
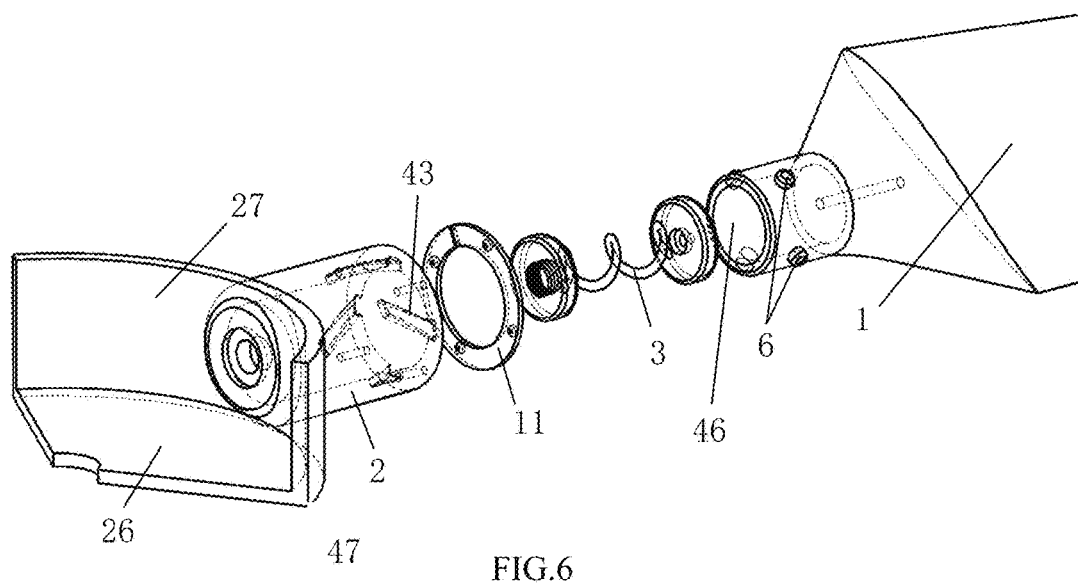
FIG. 6 is a see-through exploded view of Embodiment A.

For Embodiment A an elastic member (3) is depicted as a helical spring. There is a hole in each endplate of the elastic member (FIG. 5) to accommodate threaded fasteners. The blade root (FIG. 6) and hub also have holes to accommodate said fasteners. One end of each elastic member connects to a blade root and its other end connects to the hub. The elastic members pass through the center of blade housings and the center of blade roots. The inner lateral surfaces of the blade roots and blade housings (46, 44) prevent elastic elements from buckling if compressed. Guides are circumferentially disposed about the inner lateral surfaces of the blade housings. They are depicted as grooves cut into the inner lateral surface.

Guide-mating parts (6) are shown as a circular array of protruding nubs that surround the blade root. As the blade root slides into the blade housing the guide-mating parts slide into the guides. A threaded fastener is used to bolt the unattached end of the elastic member to the blade housing (2) or hub sidewall (27) from the inside of the hub, as implied by FIG. 6.

Once blades are mounted onto blade housings retention parts (11) are installed to prevent blades from slipping out of the blade housings. An example retention part is shown as a flexible ring with a slit cut through it such that it can be pulled open, placed against the open tip of a blade housing, and secured with threaded fasteners. It covers the open end of the guides.

Figure 7:
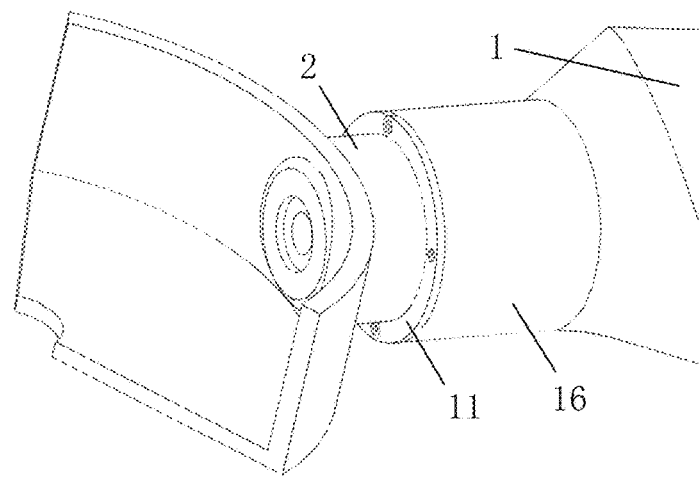
FIG. 7 is an alternate form of Embodiment A where the blade root slides over the blade housing.
Figure 8:
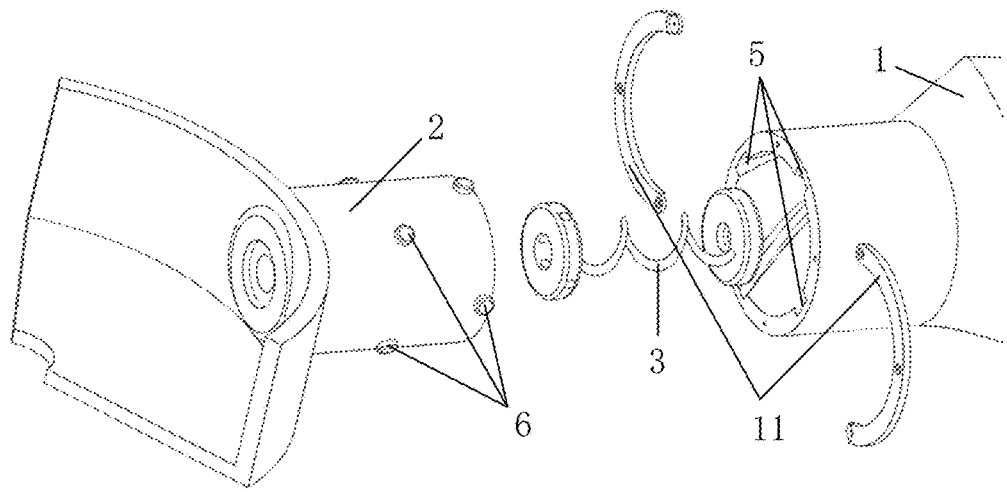
FIG. 8 illustrates guides on the blade root and guide-mating parts on the blade housing.

An alternative version of Embodiment A is presented in FIG. 7, where the inner diameter of blade roots is made larger than the outer diameter of blade housings such that blade roots slide over blade housings. The retention part can consist of two separate pieces that come together and screw into the open end of blade roots, as depicted in FIG. 8. Guides need-not be located on blade housings; they can also be placed on blade roots. When guides are placed on blade roots guide-mating parts should be placed on blade housings, which is also illustrated in FIG. 8.

Figure 9:
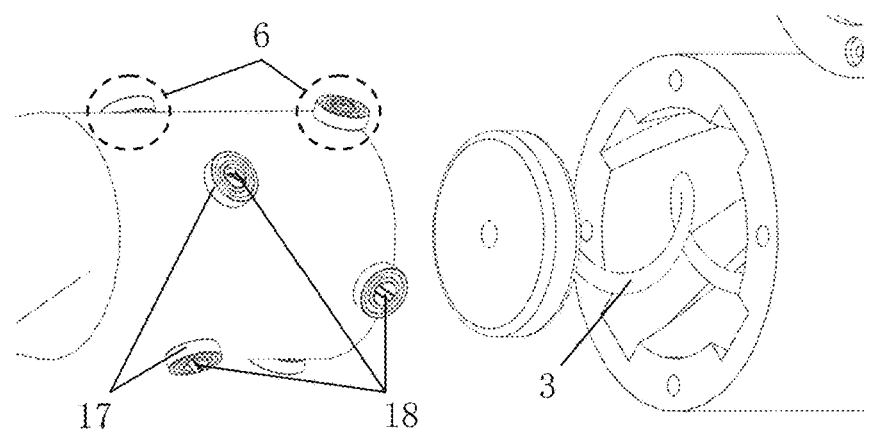
FIG. 9 depicts low-friction guide-mating parts.

Guide-mating parts can include two circular arrays at different longitudinal positions around a blade root or blade housing, as seen in FIGS. 8 and 9. Longitudinal separation of the two circular arrays supports blade bending, avoids binding between blade roots and housings, prevents inner and outer translating surfaces from directly contacting one-another, and allows a user to omit radial linear bearings. The cross-sectional shape of blade roots and blade housings need-not be circular provided an adequately large gap size between blades and blade housings.

A unique type of special-built friction-reducing system in depicted in FIG. 9. Its guide-mating parts have two bearings: one normal (17) and one binormal (18). The normal bearing spins about an axis that is perpendicular to that of the binormal bearing. The binormal bearing is located within the normal bearing and contacts the bottom of groove-like guides during use. The binormal bearings are angled to roll tangentially along the guides without dragging. Normal bearings are made slightly smaller than the width of the groove-like guides. As a result, they contact only one wall of the guides at a time so they spin without dragging. The binormal bearings need-not be placed at the center of normal bearings; they can also be completely separated.

Blade housings will typically be blunt objects, which can cause flow separation and turbulence when exposed to a flow of fluid. For turbomachines with small hub-to-tip ratios blade housings will protrude out of the hub and be exposed to flow, but corresponding adverse flow effects will be minimal. For large hub-to-tip ratio turbomachines blade housings can be partially or completely enveloped by the hub, as in FIG. 10. In this case they are not exposed to outside flow, which reduces flow separation, wake-turbulence, and drag over blade housings.

Figure 10:
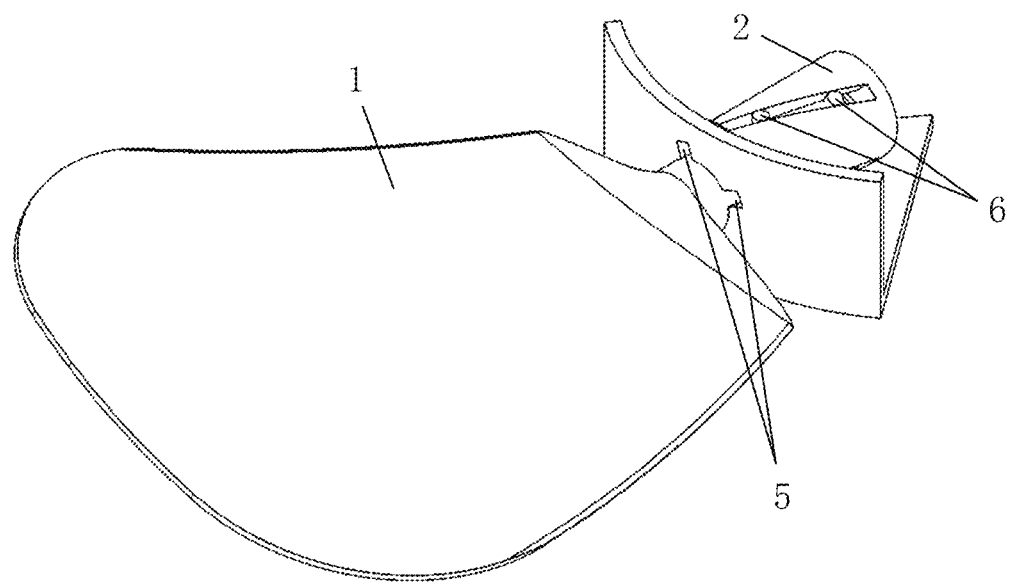
FIG. 10 depicts Embodiment A, but with hub-internal blade housings.
Figure 11:
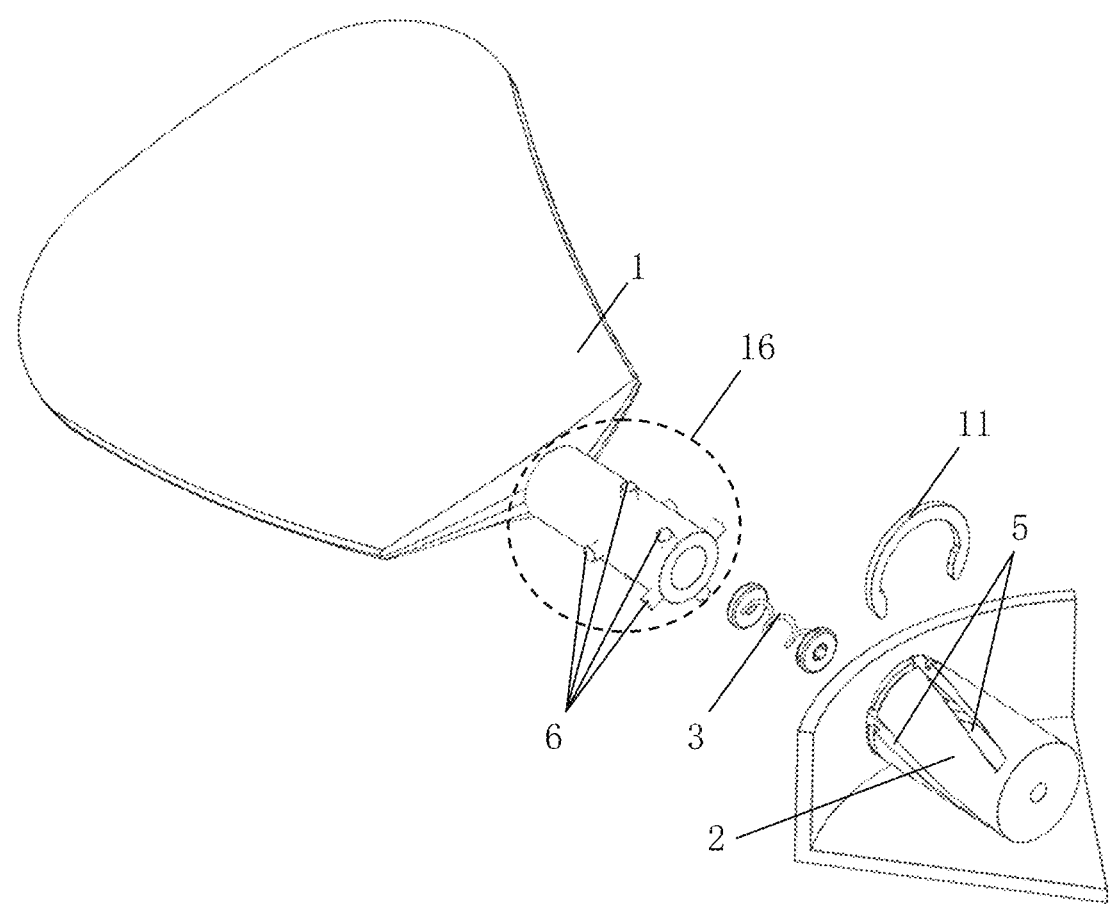
FIG. 11 depicts an alternative retention part for Embodiment A.

Utilized blades can be of any type, including axial fan blades (FIG. 10). Guides can be cut all-the-way through blade housings. Furthermore, the retention part can consist of a snap ring placed inside the hub, as depicted in FIG. 11.

Embodiment B

For some applications it is necessary to include a blade weight assembly to counteract the component of a blade's weight acting in its housing-longitudinal direction. The blade weight assembly can counteract this component regardless of the blade's rotation angle about the shaft. The need for a blade weight assembly increases with the weight of each blade and how closely to horizontal (perpendicular to the direction of gravity) the hub axis is oriented. The need for a blade weight assembly decreases with increasing hub rotation-rate and becomes zero when the hub axis is vertical (parallel to the direction of gravity). The blade weight assembly of Embodiment B is not appropriate for applications with significantly varying blade-disc orientation (e.g. a full-scale propeller-driven fighter plane).

Figures 12, 13, 14:
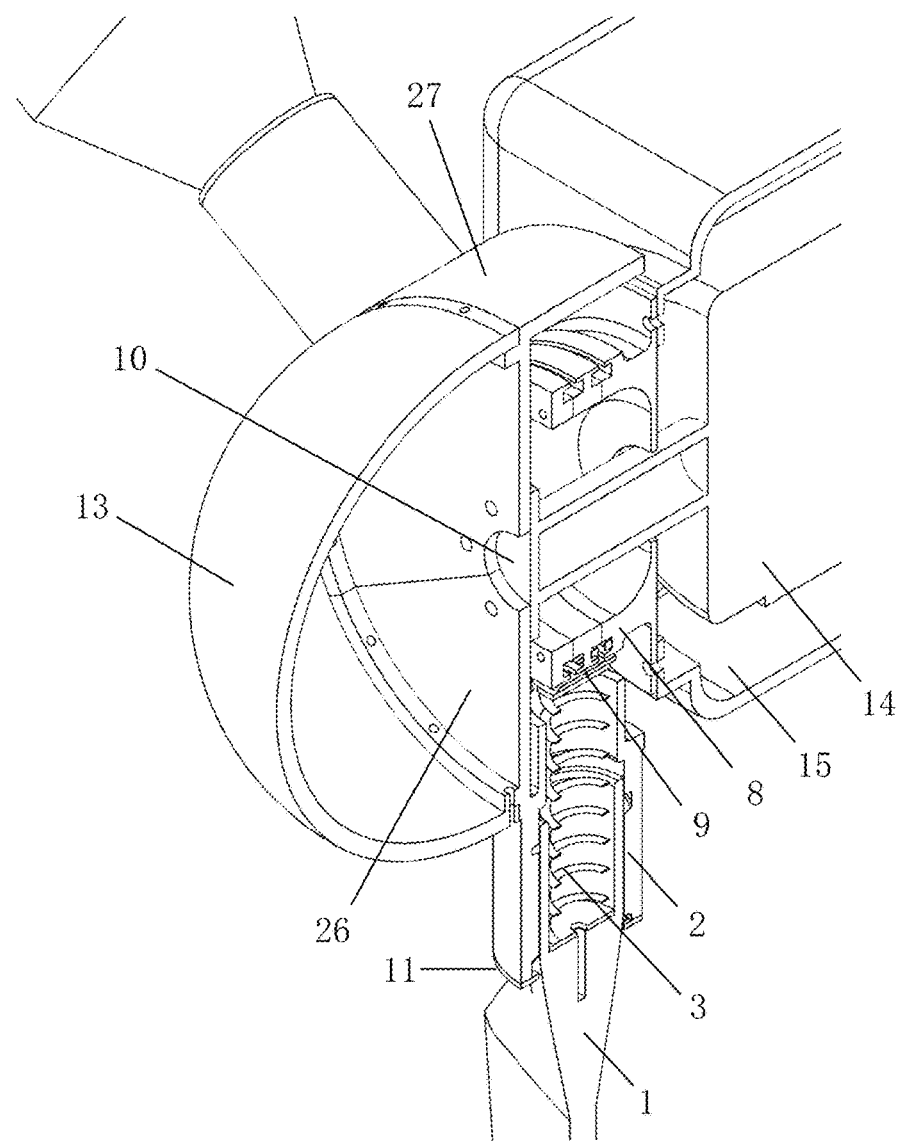
FIG. 12 is a cutaway view of Embodiment B with a blade weight assembly.
FIG. 13 shows a motor cover for Embodiment B.
FIG. 14 depicts an example motor for Embodiment B.

Embodiment B is depicted in FIG. 12. There is a motor (14) inside of a motor housing (15). The motor and motor housing are depicted in FIGS. 13 and 14, respectively. For this example embodiment the backplate (26) of the hub (12) bolts to a plate that is welded onto the motor's shaft (10). In general, there are many different ways to attach a hub to a shaft, any of which can be used. For Embodiment B the rotating cover (13) attaches to the sidewall (27) of the hub around its periphery using threaded fasteners. Blade housings can be made with the backplate and sidewall as one piece. Alternatively, blade housings can be made separately and then attached to the sidewall by placing threads on outer lateral surfaces of blade housings and by placing corresponding threaded holes in the sidewall. There are many other ways to join a hub sidewall and individually-produced blade housings, including use of an array of fasteners, or by joining with an adhesive. Regardless of the technique used care must be taken to ensure that blade housings and guides are properly oriented after installation.

Figure 15:
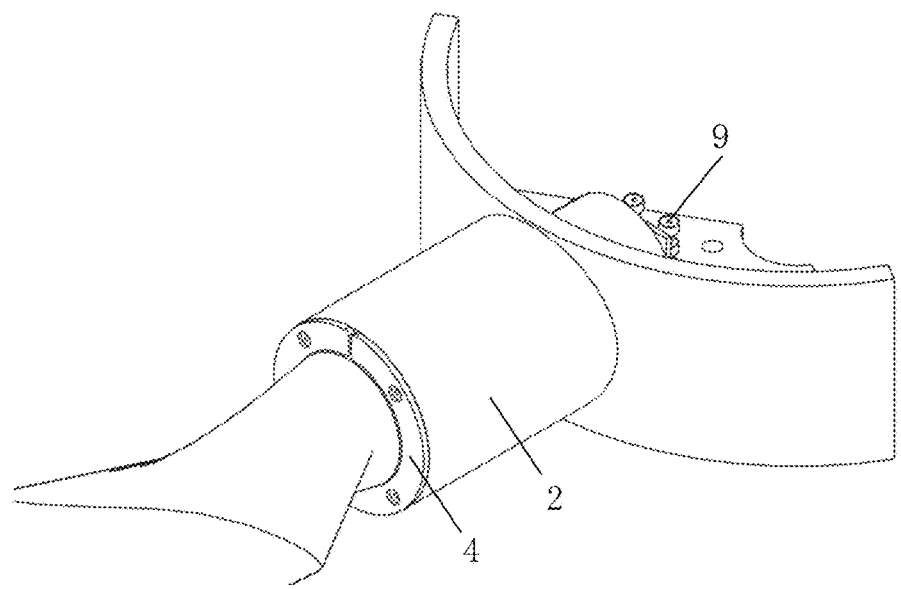
FIG. 15 shows an assembled blade and blade housing for Embodiment B.
Figure 16:
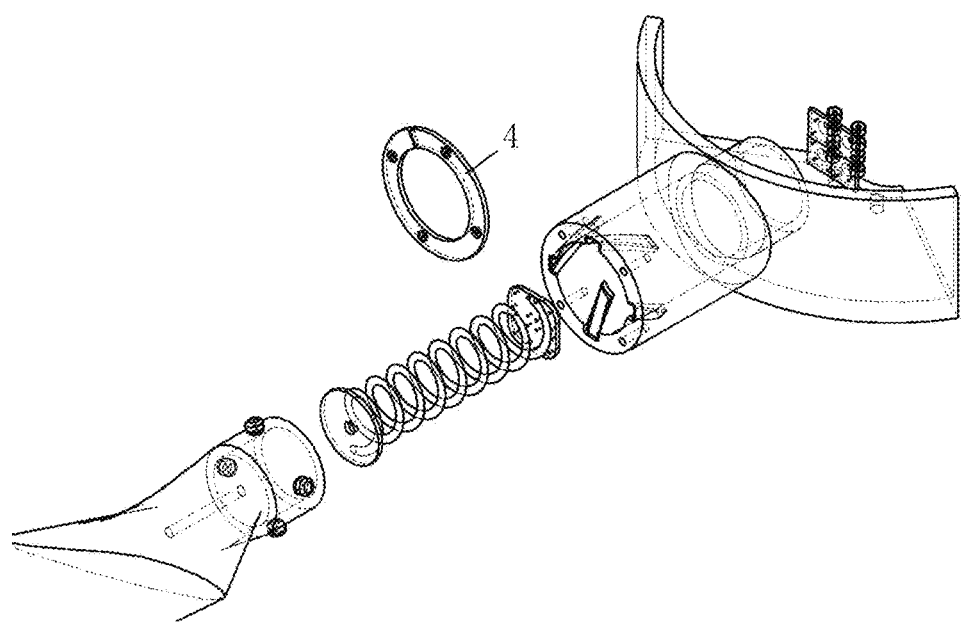
FIG. 16 is an exploded view of the blade and blade housing for Embodiment B.
Figure 17:
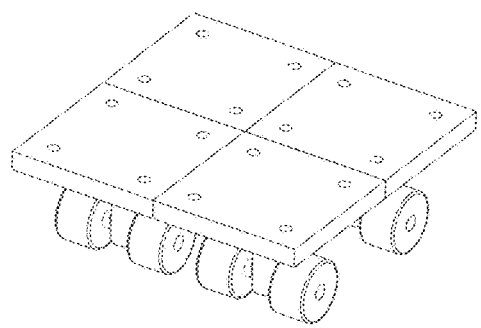
FIG. 17 is an isometric view of an example track-mating part.

For Embodiment B track-mating parts (9) are depicted as rollers, as seen in FIG. 15. They attach to elastic elements using multiple bolts, as seen in FIG. 16. Other methods of attachment are equally-valid. Embodiment B has eight wheels (FIG. 17), but more or fewer wheels may be used. For embodiments similar to Embodiment B at least four wheels are recommended per track-mating part.

Figure 18:
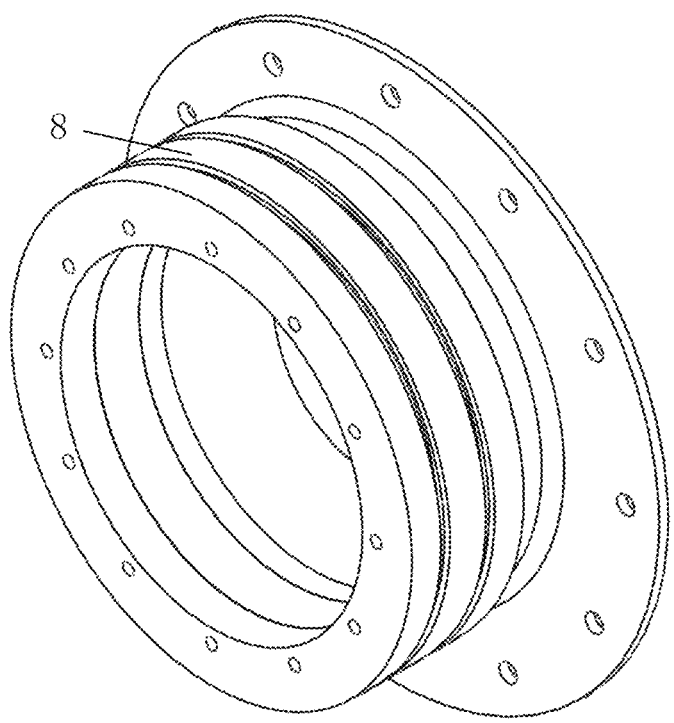
FIG. 18 provides example tracks.
Figure 19:
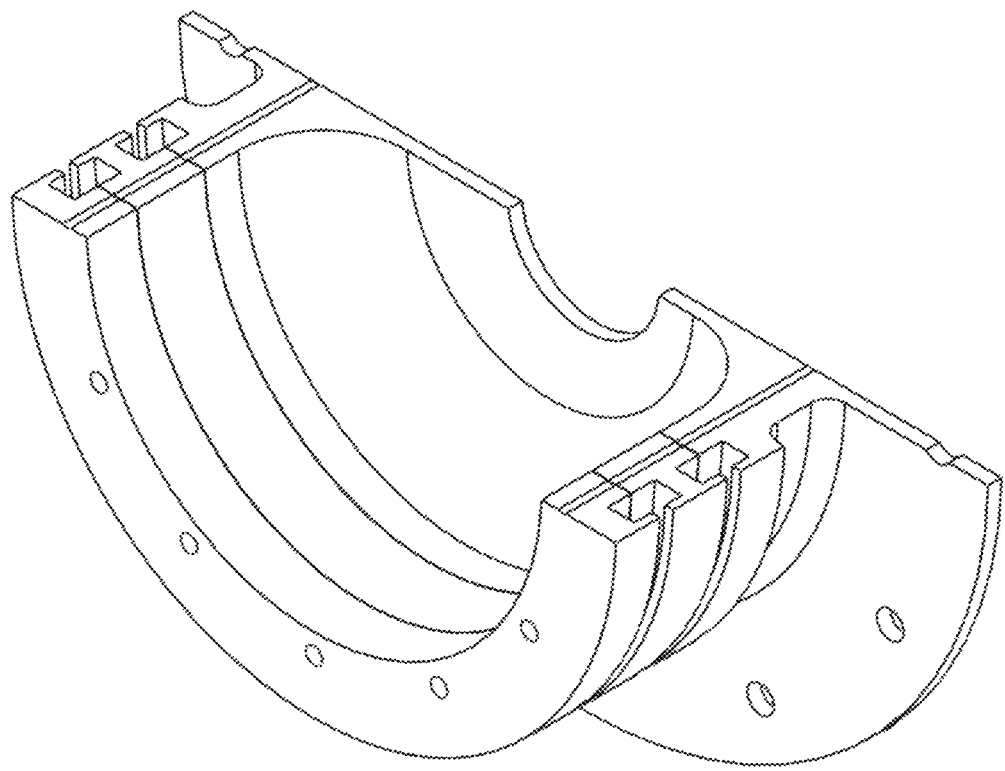
FIG. 19 is a cutaway view of tracks.
Figure 20:
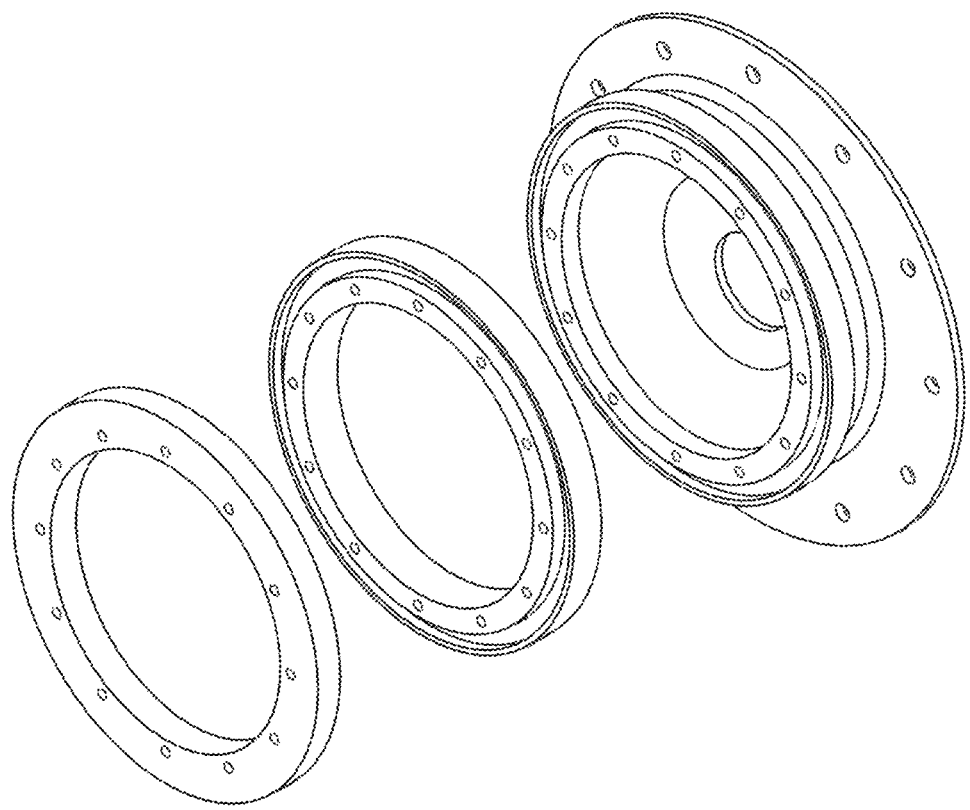
FIG. 20 is an exploded view of tracks.
Figure 21:
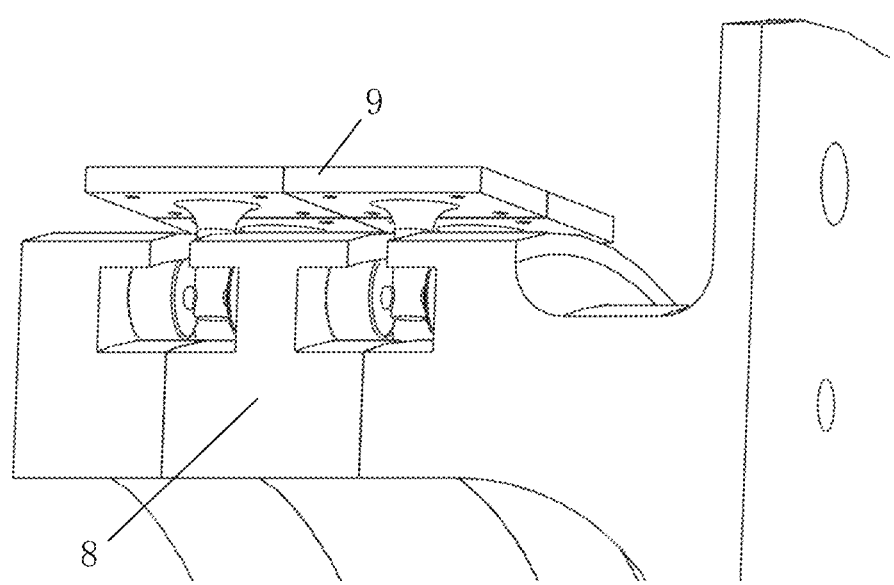
FIG. 21 shows tracks with track-mating parts installed.
Figure 22:
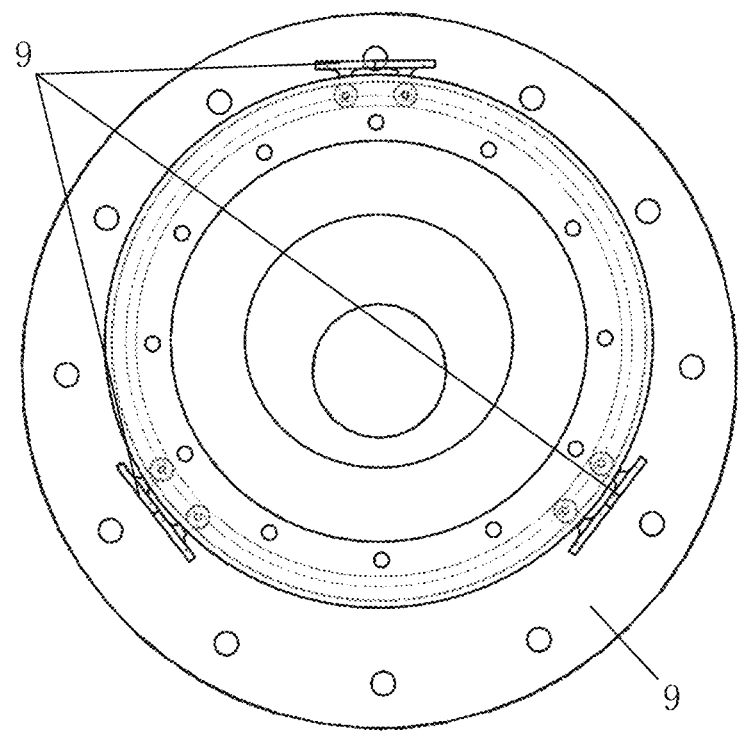
FIG. 22 is a see-through front-view of the tracks with track-mating parts that clearly illustrates track non-circularity and vertical-offset.

The track (8) of the blade weight assembly forms closed-loops which need-not be circular (FIG. 18). For the depicted embodiment the track resembles two parallel rectangular channels constructed using three concentric parts (FIG. 19), which also need-not be circular. The aftmost concentric part is fixed to the motor housing with threaded fasteners. Each concentric part has an array of holes around its periphery through-which it is fastened together with the other concentric parts (FIG. 20). The track-mating parts are placed within the tracks as the three concentric parts of the track (8) are fastened together (FIG. 21). The track-mating parts are constrained to move along the track, and cannot be removed from the track without disassembling the concentric parts (FIG. 22). The track is vertically-offset from the hub axis and there is one track-mating part for each blade.

Figure 23:
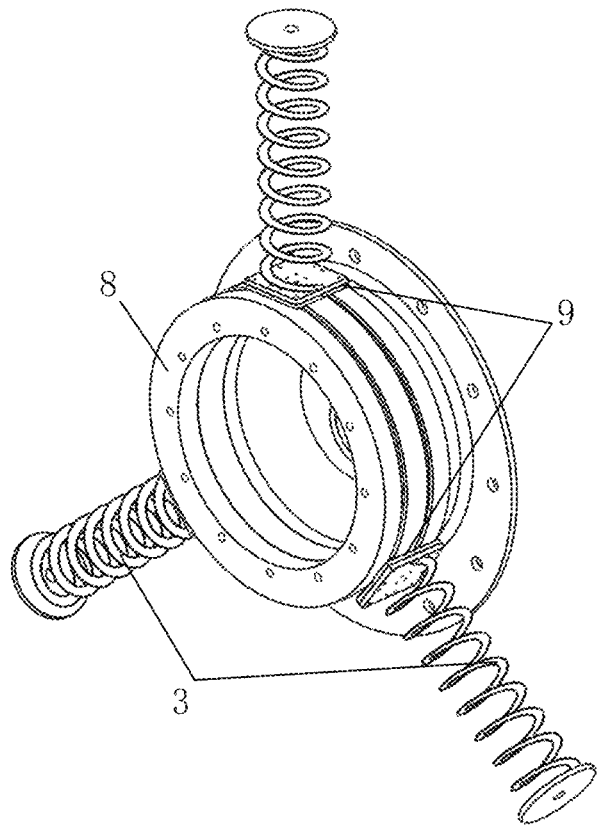
FIG. 23 depicts elastic members attached to track-mating parts.

The elastic elements (3) are helical springs attached to track-mating parts (9) at one end (FIG. 23) and blade roots (16) at the other, all using threaded fasteners. The blades (1) are kept within blade housings (2) using retention parts (11), as for Embodiment A.

There is a hole through the hub which has a similar diameter to that of the inner diameter of the cylindrical blade housings (FIG. 12, 16). For Embodiment B the elastic elements are depicted as springs that pass through the hole in the sidewall and the blade housings to connect to blade roots. Notice that the blade housing is extended further inward toward the tracks, which prevents buckling of elastic elements during compression. It also prevents lateral deformation of the elastic elements in the gap between the track and sidewall.

Because track-mating parts are forced to move along the track one end of each elastic element is also forced to move along the track. This has the effect of moving the inner-end of elastic elements as the shaft rotates. The movement of the inner-end of the elastic elements is designed to counteract the weight of each blade in its longitudinal direction.

Blades periodically rotate along with the shaft while their weight vectors always point downward. A weight vector component may point in the blade-longitudinal direction and add or subtract from the centrifugal force vector. As a result, there is an unwanted periodic contribution of blade weight to centrifugal force.

When the blade disc axis is horizontal (perpendicular to gravity) and a blade is at its lowest position the blade's weight will add to centrifugal force, causing its attached elastic element to undergo excessive tensile deformation. The result is that the blade will translate too far downward. To counter this, the track forces the inner end of the elastic element to move upward toward the hub axis (FIG. 22). The opposite occurs when a blade is at the top of its rotation and its weight opposes centrifugal force. In this case the elastic element's tensile deformation is insufficient, such that the blade will not translate far enough upward. To compensate, the track forces the inner end of the elastic element to move further upward, away from the hub axis. The hub axis is collinear with the shaft.

Embodiment C

Embodiment C includes additional parts, including: rods (19), bearings (20), retainers (21), bushings (22), a connector (23), arms (24), and pins (25). A general isometric view of Embodiment C is provided in FIG. 28, with the rotating cover removed.

Figure 29:
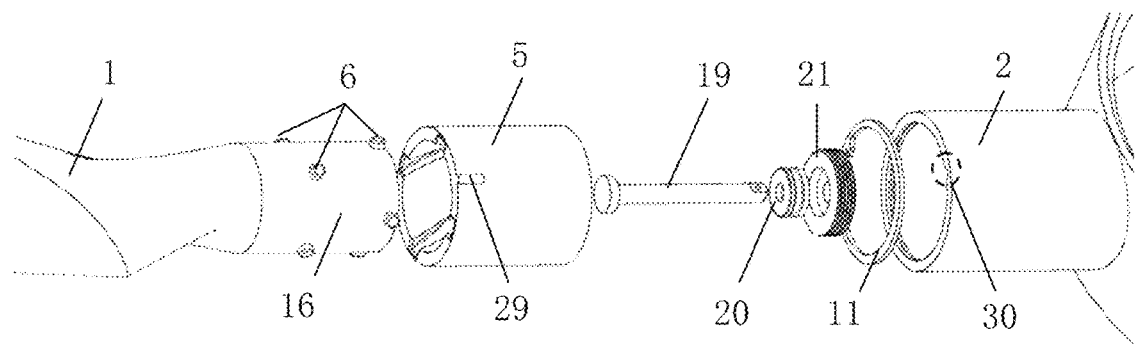
FIG. 29 is an exploded view of the Embodiment C blade and blade housing.

For Embodiment C blades (1) and blade housings (2) are combined as follows: separately-produced sleeve-like guides (5) are inserted into blade housings (2). Guides have one or more keys (29) and blade housings have one or more key holes (30). Keys and key holes mate together to prevent rotation between guides and blade housings, as shown in FIG. 29.

Figure 30:
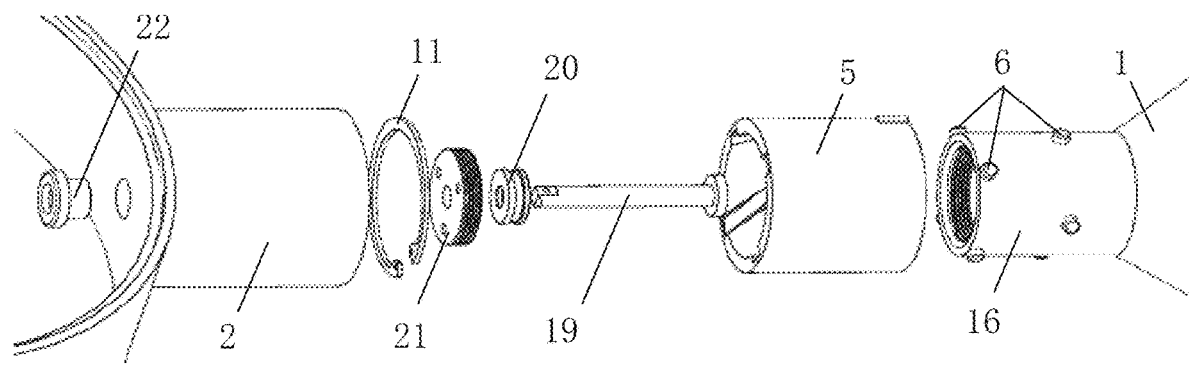
FIG. 30 is another exploded view of the Embodiment C blade and blade housing.
Figure 31:
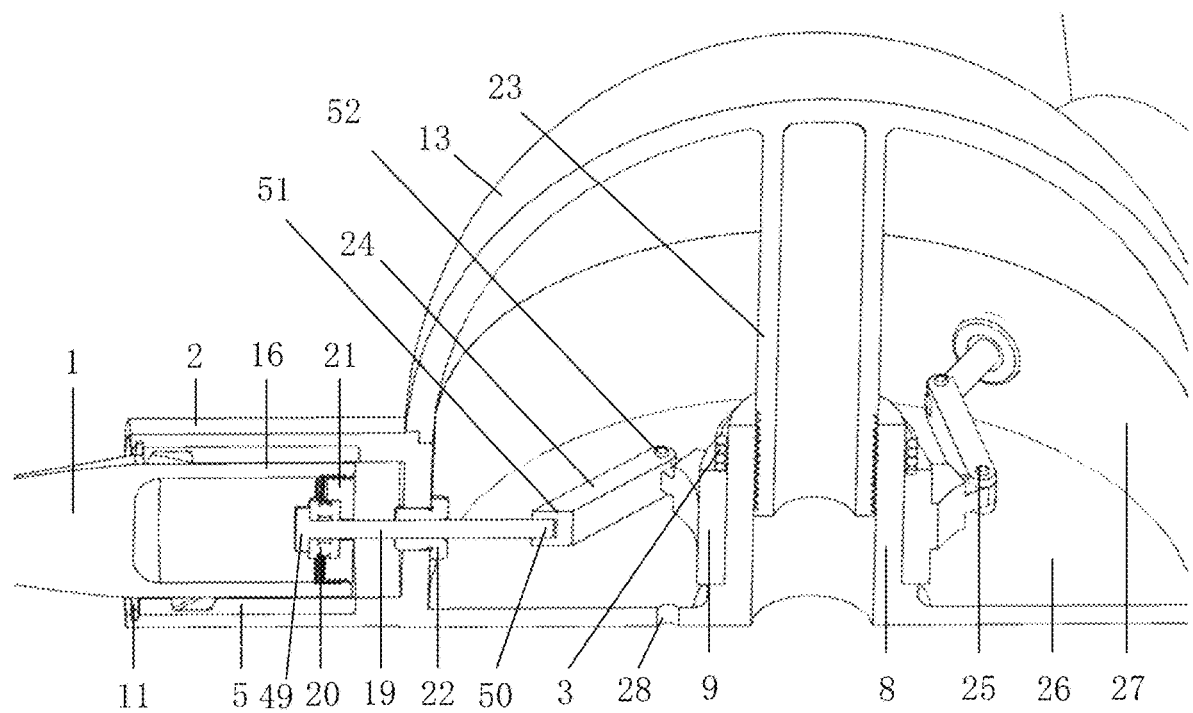
FIG. 31 is a cutaway view of the assembled Embodiment C.

A rod (19) is inserted into a bearing (20) and through a retainer (21). The bearing seats into a depression in the retainer. The retainer is threaded around its periphery. Each blade root (16) is threaded along its cylindrical inner surface, as seen in FIG. 30. The retainer (21) screws-into the blade root (16) to connect the rod (19) and bearing (20) to the blade root. The bearing (20) is a thrust bearing; the rod (19) can slide along the longitudinal direction of the blade, but the rod (19) has a head on one end to prevent it from being fully-withdrawn from the blade root, bearing, and retainer. The depth of the blade root is insufficient to allow the rod to slip too far inward. At the other end of each rod there is a hole to accommodate a pin (25) for later connection to arms (24), as seen in FIG. 31.

There is a hole at the root of each blade housing. The hole passes through the sidewall (27) of the hub (18). A bushing (22) is installed in each hole. Blade roots have guide-mating parts (6) that slide into guides (5). At the same time rods slide through the bushings and sidewall into the hub. A retention part (11) in the form of a snap-ring is installed at the outer part of each blade housing to lock-in its corresponding sleeve-like guide and blade root. The free end of each rod (19) is pinned to one end of each arm (24).

Figure 28:
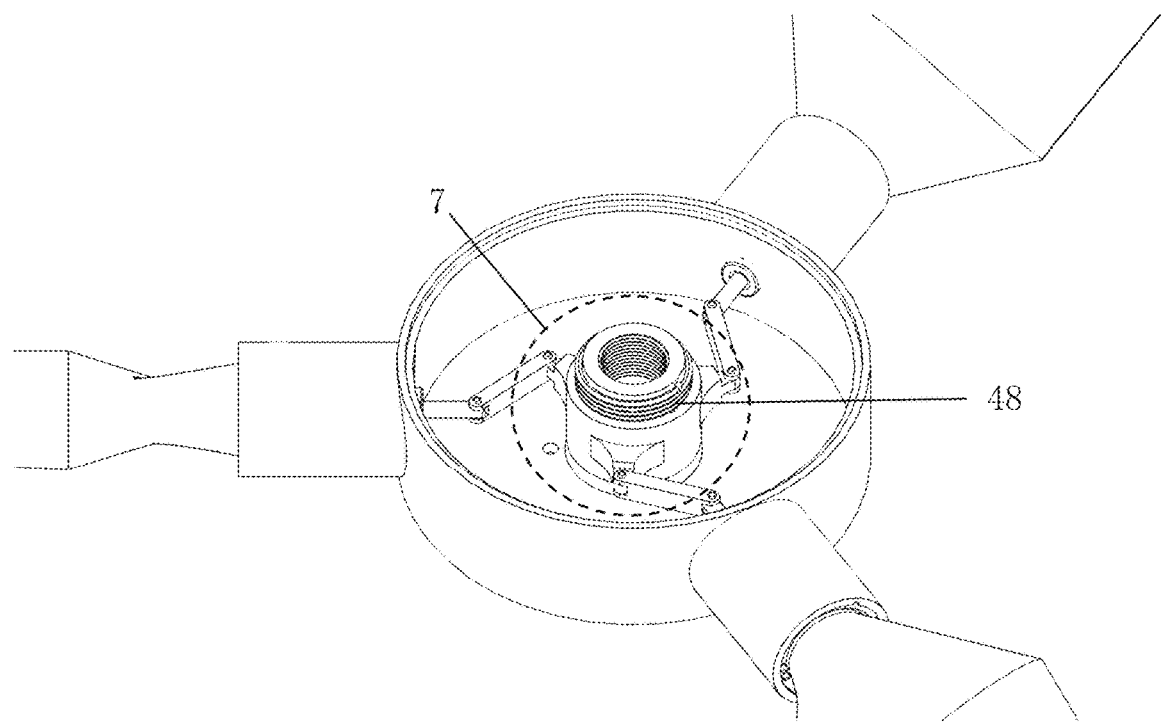
FIG. 28 shows Embodiment C with its rotating cover removed.

Embodiment C has a blade weight assembly (7), as shown in FIG. 28. It possesses only one track (8), which is: substantially rod or tube-shaped, located at the center of the hub, and aligned with the hub's axis of rotation. The tube-like track projects outward from the inside surface of the backplate (26). There is only one track-mating part (9), which is also substantially tubular or ring-shaped; it slips over the track until it stops at a small step near the bottom of the track. The track and track-mating part are concentric.

An elastic element (3) in the form of a helical torsion spring slides downward over the track, surrounding it. Alternatively, the elastic element could slide down over the track-mating part. The elastic element is fixed to the track at one end and to the track-mating part at its other end. The track-mating part can rotate around the track, but cannot translate along it. Track-mating part rotation is resisted by the elastic element.

Figure 32:
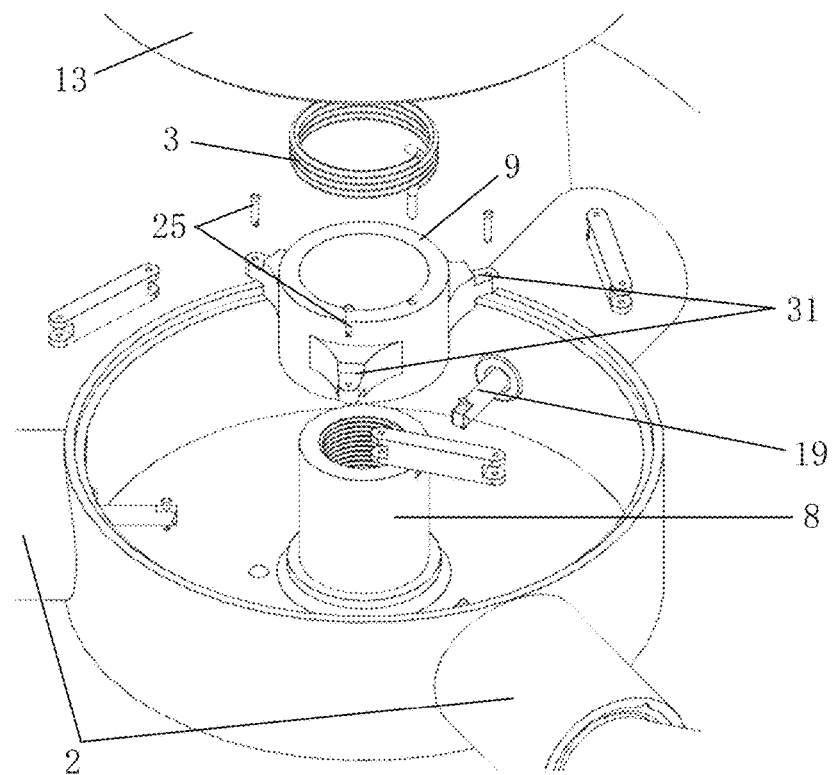
FIG. 32 is an exploded view of hub-internal parts for Embodiment C.

The track-mating part has attachment parts (31) disposed around it, as seen in FIG. 32. One end of each arm is pinned to the attachment parts, and its other end is pinned to a rod. Pinned-joints allow planar rotation of each arm relative to its corresponding track-mating part and rod. The pins (25) of Embodiment C can be clevis pins having one head (FIG. 32).

The upper inner surface of the tube-like track is threaded to facilitate installation of a rotating cover (13). The rotating cover mates with the upstream side of the hub, and is coaxial with the hub. The rotating cover has a central tube-like connector (23) that protrudes inward from the center of its inner dome or cone-like surface. The connector (23) is threaded at one end to allow the rotating cover to screw-into the track. Alternatively, the connector can have an inner diameter larger than that of the track and then screw-over the track. There is a step around the periphery of the open end of the rotating cover (13). The step mates with a step along the open end of the sidewall (27) to provide a smooth continuous surface between the rotating cover and sidewall.

When the hub rotates a moment is exerted about the rotating cover that tends to tighten it. At the same time centrifugal forces pull outward on the blades, which cause rods to move outward. Outward translation is converted into track-mating part rotation via the pinned arms. Outward translation stops when a moment-balance about the track-mating part is reached. The balance occurs between moment arising from the deformed elastic element and moment arising from centrifugal forces exerted on blades.

All three blades are mechanically forced to have the same pitch at the same rotation rate regardless of blade weight or blade orientation. Blades near the bottom of the blade disc will increase outward force. At the same time, other blades near the top of the blade disc will decrease outward force. In this way the effect of blade weight is automatically canceled-out regardless of blade disc inclination angle or the local acceleration of gravity. It will work equally-well in space, on mars, in a horizontal plane, a vertical plane, or anywhere in-between. The blade weight assembly of Embodiment C mechanically forces all blades to have the same longitudinal position and pitch at the same time. If there is excessive friction in one of the guides the corresponding blade will not deviate from the pitch angle of the other blades.

The described pitch control system adopts a purely mechanical mechanism that is not affected by power outages, sensor inaccuracies, or user errors. This approach enhances system reliability. The overall structure is fairly simple. Manufacturing and maintenance costs are expected to be reasonably low.

While the foregoing written description of the invention enables a person having ordinary skill in the art to make and use what is considered presently to be the best mode thereof, those of ordinary skill in the art will understand and appreciate the existence of variations, combinations, and equivalents of the specific embodiment, process, and examples herein. The invention should therefore not be limited by the above described embodiments, processes, and examples, but by all embodiments and processes within the scope and spirit of the invention.

(1) DEFINITIONS

"Shaft" refers to the shaft about which the hub and blades rotate. This shaft may be connected to a motor directly, or through a gearbox, or another set of linkages.

"Motor" for the purposes of this patent is interpreted to include motors, engines, and generators. The "motor" drives, or is driven-by, rotating blades.

"Elastic member" refers to any non-rigid part or set of parts, connected to blades directly or indirectly, that can resist translation of blades relative to blade housings.

"Guide" refers to any track, groove, slot, channel, path, rail, bar, rod, or other device that forces properly-designed guide-mating parts to travel along it. "Guide" specifically applies to pitch mechanisms.

"Guide-mating part" refers to any protruding part, peg, tongue, roller, wheel, slider, ring, or other device that can mate with a guide such that it is forced to travel along said guide. "Guide-mating part" specifically applies to pitch mechanisms.

"Track" refers to any track, groove, slot, channel, path, rail, bar, rod, tube, or other device that forces properly-designed track-mating parts to travel along it. "Track" specifically applies to blade weight assemblies.

"Track-mating part" refers to any protruding part, tongue, roller, wheel, slider, collar, tube, or other device that can mate with a track such that it is forced to travel along said track. "Track-mating part" specifically applies to blade weight assemblies.

"Retention part" refers to any part that prevents blades from translating outward far enough to slip out of or off of their respective blade housings. Retention parts need-not be ring-shaped.

"Pitch mechanism" refers to any mechanism or set of mechanisms used to force blades to pitch as they translate relative to blade housings.

"Blade weight assembly" refers to an assembly of parts that partially or fully counteracts the effect of blade weight on blade pitch angle.

"Helical" and "Spiral" refer to a curve, or movement along a curve, formed by any line drawn on a plane when that plane is wrapped around a cylindrical surface "Any line" includes lines that are curved and/or have non-continuous derivatives (not smooth).

"Cylinder" "cylindrical" and "cylindrically" should not be construed as limited to right, solid, or circular cylinders.

(2) LIST OF SYMBOLS

1—blade; 2—blade housing; 3—elastic member; 4—pitch mechanism 5—guide; 6—guide-mating part; 7—blade weight assembly; 8—track; 9—track-mating part; 10—shaft; 11—retention part; 12—hub; 13—rotating cover; 14—motor; 15—motor cover; 16—blade root; 17—normal bearing; 18—binormal bearing; 19—rod; 20—bearing; 21—retainer; 22—bushing; 23—connector; 24—arm; 25—pin; 26—backplate; 27—sidewall; 28—mounting hole; 29—key; 30—keyhole; 31—attachment parts; 40—hub axis; 41—longitudinal axis of the blade housing; 42—imaginary plane; 43—segment of helical path; 44—lateral interior surface of blade housing;

45—lateral exterior surface of blade housing; 46—lateral interior surface of blade root; 47—lateral exterior surface of blade root; 48—torsion spring; 49—first end of the rod; 50—second end of the rod; 51—first end of the arm; 52—second end of the arm; 53—increasing pitch section; 54—decreasing pitch section; 55—installation section; 100—pitch control system.

What is claimed is:

1. A pitch control system (100) comprising:
   (a) a hub (12);
   (b) a blade housing (2) disposed on the hub (12) around a hub axis (40);
   (c) an imaginary plane B (42) being orthogonal to the hub axis (40);
   (d) a blade (1) engaging with the blade housing (2)
      (a) configured to spiral toward and away from the hub axis (40) about a segment of a helical path (43) to effect a change in a pitch of the blade (1), a direction of spiral is along a housing-longitudinal axis (41), the housing-longitudinal axis (41) has an angle θ with respect to plane B (42), wherein the angle θ has a magnitude defined |θ|≤30°;
      (b) where there are at least two blades (1) and blade housings (2);
   (e) an elastic member (3) wherein the elastic member (3) either directly or indirectly draws the blade (1) toward the hub axis (40); and
   (f) a pitch mechanism (4), effective to facilitate the blade (1) to spiral about the housing-longitudinal axis (41):
      (a) away from the hub axis (40) when, neglecting other forces, a centrifugal force is greater than an opposing elastic force in the housing-longitudinal direction (41), where both forces are exerted on the blade (1) and where the centrifugal force arises from the hub (12) rotation and an elastic force arises from one or more elastic members (3); or
      (b) toward the hub axis (40) when, neglecting other forces, said centrifugal force is less than said elastic force in the housing-longitudinal direction (41),
      wherein the pitch mechanism (4) includes a guide (5) that stretches along the segment of the helical path; and a guide-mating part (6), wherein the guide (5) and the guide-mating part (6) have a constrained-motion relationship that involves sliding or rolling along one-another to help facilitate a blade (1) to spiral along the housing-longitudinal axis (41),
   wherein the pitch mechanism includes a blade weight assembly (7), which wholly or partially counteracts the unbalancing effect of blade weight on a blade's housing-longitudinal position with respect to other blades, wherein the blade weight assembly (7) comprises:
      (a) a track (8) disposed around the hub axis (40): and
      (b) a track-mating part (9), wherein the track-mating part (9) is constrained to move around the track (8).

2. The pitch control system (100) of claim 1, wherein:
   (a) the guide (5) is disposed on a lateral surface (44, 45) of the blade housing (2); and
   (b) the guide-mating part (6) is disposed on a lateral surface (46, 47) of the blade root (16).

3. The pitch control system (100) of claim 1, wherein:
   (a) the guide (5) is disposed on a lateral (46, 47) surface of the blade root (16); and
   (b) the guide-mating part (6) is disposed on a lateral surface (44, 45) of the blade housing (2).

4. The pitch control system (100) of claim 1, wherein:
   (a) an inner diameter of the blade root (16) is greater than an outer diameter of its corresponding housing (2); and
   (b) the blade root (16) slides over its corresponding blade housing (2).

5. The pitch control system (100) of claim 1, wherein the blade housing (2) is wholly or partially contained within the hub (12).

6. The pitch control system (100) of claim 1, wherein the blade housing (2) extends radially outward beyond an outer lateral surface of the hub (12).

7. The pitch control system (100) of claim 1, wherein the track (8) has a noncircular cross-section or a center that is vertically- offset from the hub axis (40).

8. The pitch control system (100) of claim 1, wherein the elastic member (3) is a helical spring that:
   (a) is aligned with the housing-longitudinal axis (41);
   (b) passes through the hub (12), sidewall (27), and blade housing (2);
   (c) connects to the blade root (16) on one end and to the blade weight assembly (7) on its other end.

9. The pitch control system (100) of claim 1, wherein:
   (a) the track (8) is cylindrically shaped; and
   (b) the track-mating part (9) is cylindrically shaped and is concentric with the track (8), wherein the track-making part (9) rotates about the track (8).

10. The pitch control system (100) of claim 1, further comprising:
    (a) a rod (19) having a first end and a second end;
    (b) an arm (24) having a first end and a second end, wherein the first end of the rod (19) lies within a blade root (16) or a blade housing (2) and passes through a hole in the sidewall of the hub (12), the second end of the rod (19) pivotally connects with the first end of the arm (24) whose second end pivotally connects with the track-mating part (9).

11. The pitch control system (100) of claim 1, wherein the elastic member (3) is a torsion spring (48) that encircles the interior or exterior of the track (8) and connects to the track-mating part (9).

12. The pitch control system (100) of claim 1 wherein:
    (a) a bushing (22) is disposed about the rod (19) effective to reduce friction as the rod (19) slides in-and-out of the hub (12) through its sidewall (27); and
    (b) a bearing (20) which reduces friction as the blade (1) rotates with respect to the rod (19).

* * * * *